United States Patent
Caton et al.

[11] 3,880,883
[45] Apr. 29, 1975

[54] 2-(HYDROXYALKYL)-CYCLOPENTANE CARBALDEHYDES

[75] Inventors: Michael Peter Lear Caton, Upminster; Edward Charles John Coffee, London; Gordon Leonard Watkins, Hornchurch, all of England

[73] Assignee: May & Baker Limited, Dagenham, Essex, England

[22] Filed: June 12, 1972

[21] Appl. No.: 261,719

[30] Foreign Application Priority Data
June 14, 1971 United Kingdom............ 27844/71
Jan. 25, 1972 United Kingdom............ 3455/72

[52] U.S. Cl........ 260/340.9; 260/468 D; 260/468 J; 260/468 K; 260/468 L; 260/514 D; 260/514 J; 260/514 K; 260/514 L; 260/566 AE; 260/557 R; 260/557 H; 260/598; 424/305; 424/317; 424/320
[51] Int. Cl............................................ C07d 13/04
[58] Field of Search.................. 260/340.9, 598

[56] References Cited
UNITED STATES PATENTS
3,402,181  9/1968  Erickson et al................ 260/340.7

Primary Examiner—Donald G. Daus
Assistant Examiner—Raymond V. Rush
Attorney, Agent, or Firm—Stevens, Davis, Miller & Mosher

[57] ABSTRACT

Therapeutically useful cyclopentane derivatives, some of which are new, of the formula:

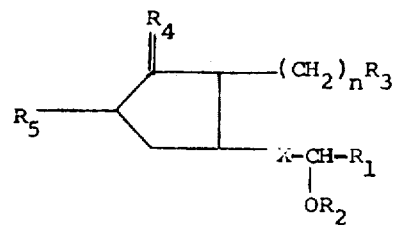

wherein $R_1$ is alkyl, alkoxyalkyl, cycloalkyl or adamantyl, $R_2$ is hydrogen, alkyl or carboxylic acyl, $R_3$ is carboxy, alkoxycarbonyl, carbamoyl, carbazoyl, or carbamoyl or carbazoyl substituted by alkyl, $R_4$ is oxygen, hydroxyimino, alkoxyimino, hydrazono or alkyl-substituted hydrazono, $R_5$ is alkyl or hydrogen, X is trans-vinylene or ethylene, and $n$ is 5,6,7 or 8, are prepared by a new process involving few steps and as intermediates new compounds of the formula:

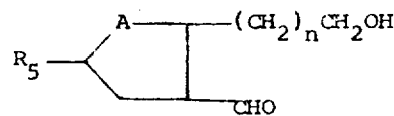

wherein A is a group

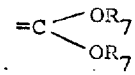

or $=C=NOR_x$, in which $R_7$ is alkyl or the symbols $R_7$ together represent an ethylene or alkyl-substituted ethylene linkage, and $R_x$ is alkyl. The cyclopentane derivatives are useful in the production of hypotension, bronchodilation, inhibition of gastric acid secretion, and stimulation of uterine contraction.

4 Claims, No Drawings

2-(HYDROXYALKYL)-CYCLOPENTANE CARBALDEHYDES

THIS INVENTION relates to a new chemical process for the preparation of therapeutically useful cyclopentane derivatives, products obtained thereby, pharmaceutical compositions containing them and to intermediates used in the process.

An object of the present invention is to provide a new process for the preparation of compounds of the general formula:

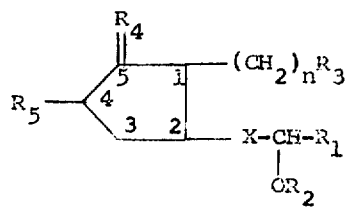

I (wherein $R_1$ represents a straight- or branched-chain alkyl group containing from 1 to 10 carbon atoms, which may be substituted by an alkoxy group, or represents a cycloalkyl group containing from 5 to 7 carbon atoms, or an adamantyl group, $R_2$ represents a hydrogen atom, an alkyl group, or a carboxylic acyl, for example alkanoyl or benzoyl, group, $R_3$ represents a carboxy group, a straight- or branched-chain alkoxycarbonyl group containing from 1 to 12 carbon atoms in the alkoxy moiety, or a carbamoyl or carbazoyl group which is unsubstituted or substituted by one or two alkyl groups, $R_4$ represents an oxygen atom, a hydroxyimino or alkoxyimino group, or a hydrazono group which is unsubstituted or substituted by one or two alkyl groups, $R_5$ represents an alkyl group or a hydrogen atom, X represents a transvinylene or an ethylene group, and $n$ represents 5,6,7 or 8) and, when $R_3$ represents a carboxy group, non-toxic salts thereof.

In this specification, it is to be understood that unless otherwise specified, alkyl groups and alkyl moieties of alkoxy, alkanoyl and alkoxyimino groups may be straight- or branched-chain and may contain from 1 to 6 carbon atoms.

As will be apparent to those skilled in the art, the structure shown in general formula I has at least three centres of chirality, two of these three centres of chirality being at the ring carbon atoms in positions 1 and 2 respectively and the third being at the carbon atom in the methylidene group linking together the groups X, $R_1$ and $OR_2$. In addition to these three centres of chirality, of course, a further centre of chirality occurs at the ring carbon atom in position 4 when $R_5$ represents an alkyl group and still further centres of chirality may occur in alkyl groups represented by, or present as moieties in the groups represented by, the symbols $R_1$, $R_2$, $R_3$, $R_4$ and $R_5$. The presence of centres of chirality, as is well known, leads to the existence of isomerism. However, the compounds of formula I produced by the process of the present invention all have such a configuration that the side chains attached to the ring carbon atoms in positions 1 and 2 are trans with respect to each other. Accordingly, all isomers of general formula I, and mixtures thereof, which have those side chains, attached to the ring carbon atoms in positions 1 and 2, in the trans configuration, are within the scope of the present invention.

It is known, for example from British Patent specification No. 1,097,533 (The Upjohn Company) that the compound of general formula I wherein $R_1$ represents a pentyl group $R_2$ represents a hydrogen atom, $R_3$ represents a carboxy group, $R_4$ represents an oxygen atom, $R_5$ represents a hydrogen atom, n represents 6 and X represents a vinylene group, which may be named as 15-hydroxy-9-oxoprost-13-enoic acid, possesses valuable hypotensive and antihypertensive properties. In the said British Patent Specification there is described a process for the preparation of that particular compound, which, as described, involves two reaction steps commencing with, as starting material, the costly natural product 11,15-dihydroxy-9-oxoprost -13-enoic acid, which is alternatively known as prostaglandin $E_1$ or $PGE_1$.

In British Patent specification Nos. 1,179,489 and 1,218,998 (Ayerst, McKenna & Harrison Limited) there is described an alternative sequence of eighteen reaction steps for the preparation of 7-[5-(3-hydroxyoct-1-enyl)-2-oxocyclopentyl]heptanoic acid, commencing with two initial starting materials which are readily accessible, i.e., ethyl 7-bromoheptanoate and the potassium salt of the enol tautomer of 2-ethoxycarbonylcyclopentanone.

In the specification of West German Offenlegungsschrift No. 1,953,232 (Ayerst, McKenna & Harrison Limited) there is described inter alia the preparation of cyclopentane derivatives of general formula I in which $R_1$ represents a straight-chain alkyl radical containing 2 to 7 carbon atoms, $R_2$ represents a hydrogen atom, $R_3$ represents a carboxy group or an alkoxycarbonyl group containing from 1 too 3 carbon atoms in the alkyl moiety, $R_4$ represents an oxygen atom, $R_5$ represents a hydrogen atom, X represents an ethylene group, and n represents 6, from bicycloheptane compounds, which process initially involves the use of the same types of starting materials as mentioned above in respect of the processes described in British Patent specification Nos. 1,179,489 and 1,218,998.

As a result of research and experimentation there has been discovered a new and improved process, which when applied to the production of 7-[5-(3-hydroxyoct-1-enyl)-2-oxocyclopentyl]heptanoic acid and related compounds, possesses advantage over the processes disclosed in British Patent specification Nos. 1,097,553, 1,179,489 and 1,218,998 and West German Offenlegungsschrift No. 1,953,232 in that it involves a small number of reaction steps from inexpensive starting materials which are readily available commercially or easily accessible by known methods.

The new process of the present invention employs as initial starting materials aldehydes of the general formula:

$$R_6O(CH_2)_nCHO$$

II wherein $R_6$ represents a hydrogen atom or a suitable acid labile group and n is as hereinbefore defined. Suitable acid labile groups are those which are easily removed by acid hydrolysis and do not cause side reactions, e.g. the 2-tetrahydropyranyl group unsubstituted or substituted by, for example, at least one lower alkyl group.

The process of the invention for the preparation of cyclopentane derivatives of general formula I wherein $R_1$ and n are as hereinbefore defined, $R_2$ represents a hydrogen atom $R_3$ represents a carboxy group, $R_4$ represents an oxygen atom and X represents a vinylene group, including 7-[5-(3-hydroxyoct-1-enyl)-2-oxocyclopentyl]-heptanoic acid, may be illustrated schematically as follows:

cess involves only eight steps as depicted and uses relatively inexpensive starting materials and is, in consequence, distinctly advantageous in relation to the known processes for the preparation of the same compounds.

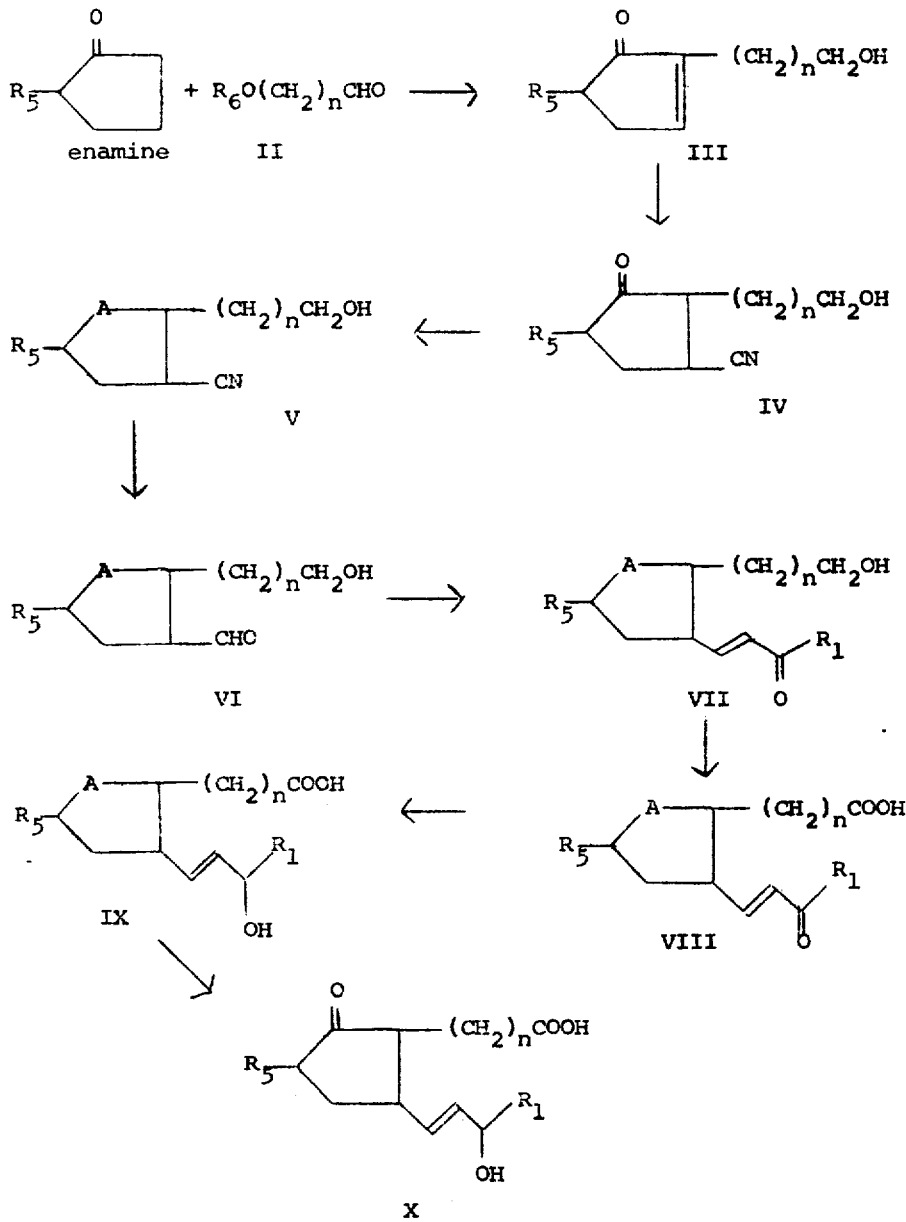

(wherein $R_1$, $R_5$, $R_6$ and n are as hereinbefore defined, and A represents a group of the general formula:

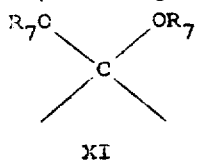 or 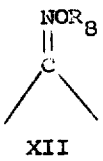

wherein the symbols $R_7$ represent identical alkyl groups, or together the groups $R_7$ form an ethylene linkage which is unsubstituted or substituted by identical alkyl groups on each carbon atom, and $R_8$ represents an alkyl group. Preferably the groups $R_7$ together form an unsubstituted ethylene linkage). This new pro- The reaction of an aldehyde of formula II and an enamine (e.g. the morpholine enamine) of a cyclopentanone to yield the 2-hydroxyalkylcyclopent-2-en-1-ones of formula III is carried out in an inert organic solvent, for example an aromatic hydrocarbon (e.g. benzene) with continuous removal of water, preferably at 60°–120°C., followed by hydrolysis in aqueous acid conditions (e.g. with hydrochloric acid), preferably at ambient temperature, and then heating with an acid, (e.g. concentrated hydrochloric acid), preferably at about 100°C., and preferably in an inert organic solvent such as an alcohol (e.g. butanol) to cause the double bond to migrate from the exocyclic to the endocyclic position.

The hydroxyalkylcyclopent-2-en-1-ones of general formula III are reacted with a source of hydrogen cyanide (e.g. acetone cyanohydrin) in the presence of a base, for example an alkali metal carbonate (e.g. sodium carbonate), in an aqueous organic solvent, for example an aqueous lower alkanol (e.g. aqueous methanol), preferably at 50°–110°C. and advantageously at the reflux temperature of the solvent employed, to give ketonitriles of formula IV.

The ketals of general formula V wherein A represents a group of formula XI are prepared from the ketonitriles of formula IV by the application or adaptation of known methods for the preparation of ketals from ketones, for example by the reaction of a compound of formula IV with the appropriate alcohol or diol in the presence of an acidic catalyst, for example p-toluenesulphonic acid, with continuous removal of water. Advantageously the reaction is effected in the presence of an inert organic solvent, for example an aromatic hydrocarbon (e.g. benzene), at an elevated temperature, such that the continuous removal of water is carried out by means of a Dean and Stark apparatus. The oximes of general formula V wherein A represents a group of formula XII are prepared from the ketonitriles of formula IV by the application or adaptation of known methods for the preparation of oximes from ketones, for example by the reaction of a compound of formula IV with the appropriate alkoxyamine in the presence of base.

The compounds of general formula V are reduced in an inert organic solvent, for example a lower dialkyl ether (e.g. diethyl ether), preferably at a temperature between −80°C. and + 30°C., to compounds of formula VI by means of known complex metal reducing agents, preferably a dialkylaluminium hydride (e.g. diisobutylaluminium hydride) in an inert organic solvent, for example an aromatic hydrocarbon (e.g. benzene). The 2-(hydroxyalkyl)-cyclopentanecarbaldehydes of formula VI are new compounds and are key intermediates of the new process of the invention.

Reaction of compounds of formula VI with a hydrocarbylcarbonylmethylene triphenyl- or trialkyl-phosphorane of the general formula:

$$(Q_3P=CH-CO-R_1) \qquad XIII$$

(wherein Q represents a phenyl group unsubstituted or substituted by a lower alkyl group, or represents a lower alkyl group, preferably n-butyl, and $R_1$ is as hereinbefore defined) in an inert organic solvent (e.g. tetrahydrofuran), preferably at a temperature of 20°–100°C. and advantageously at the reflux temperature of the reaction mixture, gives unsaturated ketones of formula VII.

These ketones are then oxidised, preferably in an inert organic solvent, by means of an agent known to convert terminal hydroxymethyl to carboxy without affecting carbon-carbon double bonds or the group A (for example chromium trioxide and sulphuric acid in dimethylformamide preferably at a temperature of −5° to +10°C.) to give cyclopentanealkanoic acids of formula VIII.

These cyclopentanealkanoic acids, preferably in an inert organic solvent, for example a lower alkanol (e.g. ethanol), are reduced by means of an agent known for the reduction of oxo to hydroxy without affecting carbon-carbon double bonds, preferably by a metal borohydride (e.g. sodium borohydride) optionally in the presence of a base, for example an alkali metal hydroxide (e.g. sodium hydroxide), to yield as products the (hydroxyalkenyl)-cyclopentylalkanoic acids of formula IX.

The ketals of general formula IX wherein A represents a group of formula XI are then subjected to aqueous acid hydrolysis, for example with dilute aqueous hydrochloric acid at 45°–70°C., to yield as products the 5-(3-hydroxyalkenyl)-2-oxocyclopentylalkanoic acids of formula X. Advantageously, as will be apparent to those skilled in the art, this hydrolysis is carried out as part of the reaction step converting compounds of formula VIII to compounds of formula IX where the reducing agent used is a metal borohydride, where during the operation of acidifying the metal salt in order to isolate the acid of formula IX, the conditions are modified, if necessary, in order to effect the hydrolysis of the ketal to a ketone of formula X. This reduces the number of reaction steps, depicted in the reaction scheme above, from eight to effectively seven.

The oximes of general formula IX wherein A represents a group of formula XII, which have not hitherto been described and are among the novel compounds of general formula I, may be converted to compounds of formula X by the application or adaptation of known methods for the conversion of oximes to ketones, for example, by treatment of an aqueous organic solution of an oxime of formuoa IX, preferably in a mixture of aqueous acetic acid and dioxan, with an aqueous solution of titanium trichloride under an atmosphere of nitrogen.

The enamines of cyclopentanones used as starting materials in the process of the invention may be prepared from the cyclopentanone and secondary amine, preferably in an aromatic hydrocarbon solvent (e.g. benzene or toluene), by the method of G. Stork et.al., J. Am. Chem. Soc. 1963, 85, 207. Preferred secondary amines are 5- or 6-membered nitrogen-containing secondary heterocyclic bases, which may carry in the ring one or two additional hetero atoms selected from oxygen and nitrogen (e.g. morpholine). When the amine contains more than one nitrogen atom, one of the nitrogen atoms is secondary and the remainder are tertiary.

The aldehyde compounds of general formula II may be prepared by the application or adaptation of known methods, or by a process which comprises the reaction of a nitrile of the general formula:

$$R_6O(CH_2)_nCN \qquad XIV$$

(wherein n and $R_6$ are as hereinbefore defined) in an inert organic solvent such as a lower dialkyl ether (e.g. diethyl ether) with a dialkylaluminium hydride (e.g. diisobutylaluminium hydride) in an inert organic solvent, for example an aromatic hydrocarbon (e.g. benzene), preferably at a temperature of −80° to +30°C.

Aldehydes of formula II, wherein the group $R_6$ is an acid labile group, e.g. 2-tetrahydropyranyl, and is represented by the symbol $R_6$, may also be prepared by oxidation of a compound of the general formula:

$$R_6 \quad O(CH_2)_nCH_2OH \qquad XV$$

(wherein n and $R_6$ are as hereinbefore defined) with an alkylcyclopentanone enamine as initial starting material because that would be liable to lead to the formation of appreciable quantities of 5-(hydroxyalkyl)-2-alkyl-2- agent known to convert hydroxymethyl to formyl without affecting the ether linkage for example the complex of sulphur trioxide with pyridine in dimethylsulphoxide at ambient temperature.

The nitriles of formula XIV are readily available commercially or easily accessible by known methods.

For the preparation of aldehyde compounds of general formula II wherein n represents 6, an advantageous alternative preparation is the cleavage of the commercially available aleuritic acid (9,10,16-trihydroxyhexadecanoic acid) by known methods, for example with aqueous sodium periodate preferably at 10°–15°C., or with lead tetraacetate. Similarly, aldehydes of formula II wherein n represents 5,7 or 8 can be prepared by the cleavage of compounds analogous to aleuritic acid.

Ketonitriles of formula IV, wherein the group $R_5$ is an alkyl group, more particularly a methyl group, and is represented by the symbol $R_5$, n being as hereinbefore defined, are preferably prepared by the alkylation of corresponding ketonitriles of formula IV, wherein $R_5$ represents a hydrogen atom, wherein the hydroxy group of the group $-(CH_2)_nCH_2OH$ is advantageously protected by means of a suitable protecting group, the said protecting group being subsequently removed by the application or adaptation of known methods. The said process possesses advantage over the use of an alkylcyclopentanone enamine as initial starting material because that would be liable to lead to the formation of appreciable quantities of 5-(hydroxyalkyl)-2-alkyl-2- cyclopenten-1-ones in addition to the required 2-(hydroxyalkyl)-5-alkyl-2-cyclopenten-1-ones of formula III, thereby necessitating a separation of isomers at some stage in the reaction sequence.

Accordingly, ketonitriles of formula IV, wherein $R_5$ represents an alkyl, preferably methyl, group, n being as hereinbefore defined, are preferably prepared by the acid hydrolysis of compounds of the general formula:

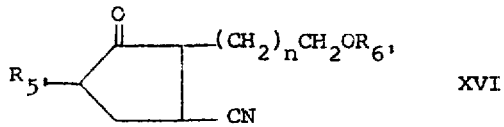

XVI (wherein $R_{5'}$, $R_{6'}$ and n are as hereinbefore defined), for example by means of a strong mineral acid, e.g., perchloric acid, in the presence of a lower alkanol, e.g. ethanol.

Compounds of formula XVI are preferably prepared by the alkylation of compounds of the general formula:

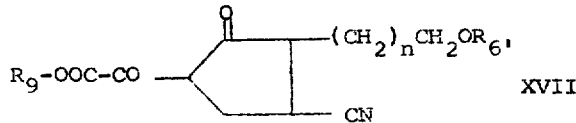

XVII (wherein $R_6$ and n are as hereinbefore defined and $R_9$ represents an alkyl, preferably ethyl, group) by means of a compound of the general formula:

$$R_{5'}\ Z_1 \qquad \text{XVIII}$$

wherein $R_{5'}$ is as hereinbefore defined and $Z_1$ represents a halogen, preferably iodine, atom. The reaction is carried out in the presence of a base, for example potassium carbonate, sodium methoxide or sodium ethoxide, in the presence of an inert polar organic solvent, for example acetone, or a lower alkanol, e.g. methanol or ethanol, and preferably at an elevated temperature, for example the reflux temperature of the reaction mixture.

Compounds of formula XVII are prepared by the reaction of compounds of the general formula:

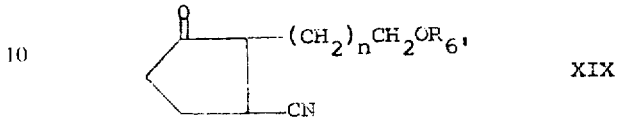

XIX (wherein $R_6$ and n are as hereinbefore defined) with a dialkyl oxalate of the general formula:

$$R_9OOC\text{-}COOR_9 \qquad \text{XX}$$

(wherein $R_9$ is as hereinbefore defined) in the presence of a base, for example a lower alkoxide of sodium, e.g. sodium methoxide, or sodium hydride. Preferably the reaction is carried out in an inert organic solvent, e.g. benzene, generally at a temperature of 0° to 30°C.

Compounds of formula XIX are prepared from ketonitriles of formula IV, wherein $R_5$ represents a hydrogen atom and n is as hereinbefore defined, by the application of known methods for the protection of a hydroxy group with a group $R_6$, for example, when $R_6$ represents a 2-tetrahydropyranyl group, by the action of 3,4-dihydro-2H-pyran in the presence of an acid, for example hydrochloric acid or toluene-p-sulphonic acid. The reaction is optionally carried out in the presence of an inert organic solvent, for example, benzene or chloroform, preferably at a temperature of 40° to 70°C.

The hydrocarbylcarbonylmethylenephosphoranes of formula XIII used in the above process for reaction with the 2-(hydroxyalkyl)cyclopentanecarbaldehydes of formula VI to give the unsaturated ketones of formula VII may be prepared by the reaction between a halomethyl ketone of the general formula:

$$Z_2\text{-}CH_2COR_1 \qquad \text{XXI}$$

(wherein $R_1$ is as hereinbefore defined and $Z_2$ represents a bromine or chlorine atom) and an appropriate triphenyl or trialkylphosphine in a suitable organic solvent (e.g. chloroform) under a nitrogen atmosphere, preferably at a temperature of 20°–100°C. and advantageously at the reflux temperature of the reaction mixture, followed by reaction of the resulting 2-oxoalkylphosphonium halide with an inorganic base (e.g. aqueous sodium carbonate) at ambient temperature.

It will be appreciated that the carboxy group of the compounds of formulae IX (wherein A represents a group of formula XII) and X can be converted by the application or adaptation of known methods into derivatives thereof such as alkoxycarbonyl groups or carbamoyl or carbazoyl groups unsubstituted or substituted by alkyl groups, that the carbonyl group in the compounds of formula X can be converted by the application or adaptation of known methods into derivatives thereof such as oximes, alkoxyimines or hydrazones where the hydrazono groups are unsubstituted or substituted by one or two alkyl groups, that the hydroxy group in the compounds of formulae IX (wherein A represents a group of formula XII) and X can be converted by the application or adaptation of known methods to alkoxy or acyloxy groups, and that the vinylene group in the compounds of formulae IX (wherein A represents a group of formula XII) and X can be reduced by the application or adaptation of known methods to an ethylene group. From compounds so obtained, other cyclopentanone derivatives of general formula I can similarly be prepared by the application or adaptation of known methods.

Thus, compounds of general formula I in which $R_3$ represents an alkoxycarbonyl group can be prepared by the reaction of a corresponding carboxylic acid of general formula I in which $R_3$ represents a carboxy group with an alcohol of the general formula:

$$R_{10}OH \qquad \text{XXII}$$

(wherein $R_{10}$ represents an alkyl group containing from 1 to 12 carbon atoms), an excess of which may be employed as solvent medium, in the presence of an inorganic acid, e.g. hydrochloric acid or sulphuric acid, preferably at a temperature between 50° and 160°C. and advantageously at the reflux temperature of the reaction mixture, or, where $R_{10}$ can be represented by the formula $-CHR_{11}R_{12}$ (wherein the symbols $R_{11}$ and $R_{12}$ each represent a hydrogen atom or a lower alkyl group), with a diazoalkane of the general formula:

$$R_{11}R_{12}C=N_2 \qquad \text{XXIII}$$

(wherein $R_{11}$ and $R_{12}$ are as hereinbefore defined) in an inert organic solvent medium, preferably a dialkyl ether (e.g. diethyl ether), preferably at ambient temperature. Alternatively, a silver salt of such carboxylic acids of formula I can be reacted with an alkyl halide $R_{10}Z_3$, wherein $Z_3$ represents a halogen atom and $R_{10}$ is as hereinbefore defined, optionally in the presence of an inert organic solvent such as an aromatic hydrocarbon (e.g. benzene) at elevated temperature and advantageously at the reflux temperature of the reaction mixture.

Amides of formula I, wherein $R_3$ represents a carbamoyl group unsubstituted or substituted by up to two alkyl groups, can be prepared by the application or adaptation of known methods, for example:

a. by the reaction of a compound of the general formula:

$$HNR_{13}R_{14} \qquad \text{XXIV}$$

(wherein $R_{13}$ and $R_{14}$ each represents a hydrogen atom or an alkyl group) with a compound of the general formula:

XXV (wherein $R_1$, $R_2$, $R_4$, $R_5$, n and X are as hereinbefore defined and $R_{15}$ represents an alkyl group containing from 1 to 12 carbon atoms) in an inert organic solvent, e.g. a lower alkanol (preferably ethanol) or benzene, preferably at a temperature of 50°–100°C. and advantageously at the reflux temperature of the reaction mixture, optionally in the presence of a basic catalyst, for example an alkali metal alkoxide, in a lower alkanol, e.g. sodium ethoxide in ethanol;

b. by the reaction of a compound of formula XXV with formamide or an alkylated formamide in the presence of a basic catalyst, e.g. sodium methoxide, according to the method described by Allred and Hurwitz, J. Org. Chem. 1965, 30, 2376;

c. as a further alternative, the same such amides of general formula I, except for those wherein $R_2$ represents a hydrogen atom, can be prepared by reacting a corresponding acid halide of the general formula:

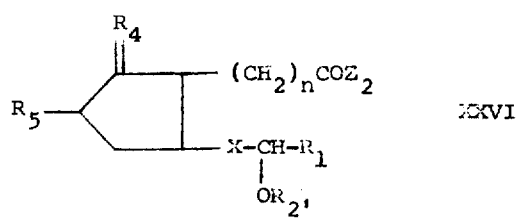

XXVI (wherein $R_1$, $R_4$, $R_5$, n, X and $Z_2$ are as hereinbefore defined and $R_{2'}$ represents an alkyl or an acyl, for example alkanoyl or benzoyl, group) with a compound of formula XXIV, preferably at ambient temperature and optionally in an inert organic solvent, for example a di(lower) alkyl ether.

Hydrazono-hydrazides of formula I, wherein $R_3$ represents a carbazoyl group unsubstituted or substituted by one or two alkyl groups, $R_4$ represents a hydrazono group unsubstituted or substituted by one or two alkyl groups and $R_1$, $R_2$, $R_5$, n and X are as hereinbefore defined, may be prepared by the application or adaptation of known methods, for example by the substitution of compounds of formula XXIV by compounds of the general formula:

$$H_2NNR_{13}R_{14} \qquad \text{XXVII}$$

(wherein $R_{13}$ and $R_{14}$ are as hereinbefore defined) in the processes (a) and (c) immediately hereinbefore described for the preparation of amides of formula I.

Hydrazides of formula I, wherein $R_3$ represents a carbazoyl group unsubstituted or substituted by one or two alkyl groups, $R_4$ represents an oxygen atom and $R_1$, $R_2$, $R_5$, n and X are as hereinbefore defined, may be prepared by the reaction of compounds of formula XXVII with compounds of the general formula:

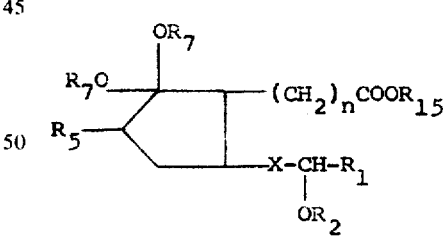

XXVIII or

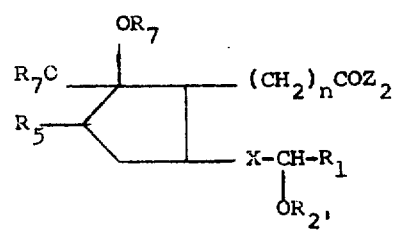

XXIX (wherein $R_1$, $R_2$, $R_{2'}$, $R_5$, $R_7$, $R_{15}$, n, X and $Z_2$ are as hereinbefore defined) in conditions similar to those hereinbefore described for the preparation of amides by reaction of compounds of formula XXIV with compounds of formula XXV and XXVI by processes (a) and (c), followed by conversion to the corresponding ketones in conditions similar to those hereinbefore described for conversion of compounds of formula IX (wherein A represents a group of formula XI) to compounds of formula X.

Compounds of the formulae XXV, XXVI, XXVIII and XXIX may be prepared from compounds of the formulae IX or I by the application or adaptation of known methods.

Compounds of formula I, in which $R_2$ represents an acyl group, can be prepared from corresponding alcohols of formula I, in which $R_2$ represents a hydrogen atom, by the application or adaptation of known methods, for example by reaction with the appropriate acid anhydride, preferably in the presence of a base, e.g. pyridine, preferably at ambient temperature, optionally in the presence of an inert organic solvent such as an aromatic hydrocarbon (e.g. benzene).

Compounds of formula I, in which $R_2$ represents an alkyl group and $R_3$ represents an alkoxycarbonyl group wherein the alkyl moiety corresponds to $R_2$, can be prepared by the reaction of compounds of formula IX, wherein A preferably represents a group of formula XI, with a compound of the general formula:

$$R_{15'} \quad Y \qquad\qquad XXX$$

(wherein $R_{15'}$ represents an alkyl group containing from 1 to 6 carbon atoms, and Y represents the acid residue of a reactive ester, e.g. a bromine, chlorine or iodine atom or a sulphonate or sulphate group); or alternatively with a compound of formula XXIII and a Lewis acid, e.g. boron trifluoride, in an inert organic solvent medium, preferably a dialkyl ether (e.g. diethyl ether), and preferably at a temperature between −50° and +20°C.; to give compounds wherein $R_2$ represents a group of the formula —$CHR_{11}R_{12}$ (wherein $R_{11}$ and $R_{12}$ are as hereinbefore defined), followed by conversion to the corresponding ketones in conditions similar to those hereinbefore described for conversion of compounds of formula IX to compounds of formula X.

Ketones of formula I, in which $R_4$ represents an oxygen atom, can be converted to their derivatives, such as oximes, alkoxyimines and hydrazones which may be substituted by one or two alkyl groups, by the application of adaptation of known methods, for example by reaction with the appropriate hydroxylamine, alkoxyamine or hydrazine or alkylated derivative thereof.

Compounds of formula I wherein X represents an ethylene group, $R_1$, $R_2$, $R_3$, $R_4$, $R_5$ and n being as hereinbefore defined, may be prepared, for example, by reduction of the corresponding compounds of formula I wherein X represents a vinylene group, by the application or adaptation of known methods, for example by hydrogenation in the presence of a hydrogenation catalyst, e.g. palladium on charcoal, optionally under an elevated pressure.

Compounds of formula I wherein $R_3$ represents a carboxy group may be prepared by alkaline hydrolysis of corresponding compounds of formula I wherein $R_3$ represents an alkoxycarbonyl group.

By "non-toxic salts" of the cyclopentanone derivatives of general formula I wherein $R_3$ represents a carboxy group is meant salts the cations of which are relatively innocuous to the animal organism when used in therapeutic doses so that the beneficial pharmacological properties of the parent compound of general formula I are not vitiated by side-effects ascribable to those cations. Preferably, the salts are water-soluble. Suitable salts include the alkali metal, e.g. sodium or potassium, and ammonium salts and pharmaceutically-acceptable (i.e. non-toxic) amine salts.

Amines suitable for forming such salts with carboxylic acids are well known and include, for example, amines derived in theory by the replacement of one or more of the hydrogen atoms of ammonia by groups, which may be the same or different when more than one hydrogen atom is replaced, selected from alkyl groups containing from 1 to 6 carbon atoms, hydroxyalkyl groups containing from 1 to 3 carbon atoms, cycloalkyl groups containing from 3 to 6 carbon atoms, phenyl groups, phenylalkyl groups containing from 7 to 11 carbon atoms and phenylalkyl groups containing from 7 to 15 carbon atoms wherein the alkyl moieties are substituted by hydroxy groups.

The phenyl groups and phenyl moieties of phenylalkyl groups may be unsubstituted or substituted by one or two alkyl groups containing from 1 to 6 carbon atoms. Suitable amines also include those derived in theory by the replacement of two of the hydrogen atoms of ammonia by a hydrocarbon chain, which may be interrupted by nitrogen, oxygen or sulphur atoms, to form, together with the nitrogen atom of ammonia to which its terminal groups are attached, a five- or six-membered nitrogen-containing heterocyclic ring, which heterocyclic ring may be unsubstituted or substituted by one or two alkyl groups containing from 1 to 6 carbon atoms. Examples of suitable amine cations include mono-, di- and tri-methylammonium, mono-, di- and tri-ethylammonium, mono, di- and tri-propylammonium, mono-, di- and tri-isopropylammonium, ethyldimethylammonium, mono-, di- and tri-2-hydroxyethylammonium, ethylbis(2-hydroxyethyl)ammonium, butylmono(2-hydroxyethyl)ammonium, tris(hydroxymethyl)ammonium, 1-ethyl-2-methylpiperidinium, cyclohexylammonium, benzylammonium, benzyldimethylammonium, dibenzylammonium, phenyl-2-hydroxyethylammonium, piperidinium, morpholinium, pyrrolidinium, piperazinium, 1-methylpiperidinium, 4-ethylmorpholinium, 1-isopropylpyrrolidinium, 1,4-dimethylpiperazinium, 1-butylpiperidinium, 2-methylpiperidinium and 1,3-dihydroxy-2-hydroxymethylprop-2-ylammonium.

The non-toxic salts may be prepared by reaction of stoichiometric quantities of compounds of general formula I wherein $R^3$ represents a carboxy group and the appropriate base, e.g. an alkali metal hydroxide or carbonate, ammonium hydroxide, ammonia, or an amine, in a suitable solvent which is preferably water in the case of the preparation of alkali metal salts and water or isopropanol in the case of ammonium or amine salts. The salts may be isolated by lyophilisation of the solution, or, if sufficiently insoluble in the reaction medium, by filtration, if necessary after removal of part of the solvent.

By the term "known methods" as used in this specification is meant methods heretofore used or described in the literature.

In the aforementioned British Patent specifications Nos. 1,097,533 and 1,218,998 and in U.S. Pat. Nos. 3,501,525 and 3,504,020 (M. Lapidus et al, assignors to American Home Products Corporation) there are disclosed those compounds of formula I wherein the various symbols $R_1$, $R_2$, $R_3$, $R_4$, $R_5$, n and X have the following values simultaneously: $R_1$ represents an n-pentyl group, $R_2$ represents a hydrogen atom or an alkanoyl group, $R_3$ represents a carboxy group or an alkoxycarbonyl group wherein the alkoxy moiety contains from 1 to 10 carbon atoms, $R_4$ represents an oxygen atom, $R_5$ represents a hydrogen atom, n represents 6 and X represents a transvinylene or ethylene group, and when $R_3$ represents a carboxy group, salts thereof.

In West German Offenlegungsschrift No. 1,953,232 there are disclosed those compounds of formula I wherein the various symbols $R_1$, $R_2$, $R_3$, $R_4$, $R_5$, n and X have the following values simultaneously: $R_1$ represents a straight-chain alkyl group containing from 2 to 7 carbon atoms, $R_2$ represents a hydrogen atom or an acyl group, $R_3$ represents a carboxy group or an alkoxycarbonyl group wherein the alkoxy moiety contains from 1 to 3 carbon atoms, $R_4$ represents an oxygen atom, $R_5$ represents a hydrogen atom, n represents 6 and Z represents an ethylene group.

According to a feature of the present invention there are provided novel compounds of formula I which have not been described hitherto. Among these novel compounds of formula I there are the following compounds of formula I which are outside the scope disclosed in any of the above-mentioned patents and patent application of the prior art:

a. all those compounds of formula I wherein at least one of the symbols $R_1$, $R_2$, $R_3$, $R_4$, $R_5$ and n has a significance as specified below:

$R_1$ represents a methyl group, an alkyl group containing 8, 9 or 10 carbon atoms, a branched-chain alkyl group containing from 2 to 7 carbon atoms, or an alkoxyalkyl, cycloalkyl or adamantyl group;

$R_2$ represents an alkyl group;

$R_3$ represents a carbamoyl or carbazoyl group which is unsubstituted or substituted by one or two alkyl groups, or an alkoxycarbonyl groups wherein the alkoxy moiety contains 11 or 12 carbon atoms;

$R_4$ represents a hydroxyimino or alkoxyimino group, or a hydrazono group which is unsubstituted or substituted by one or two alkyl groups;

$R_5$ represents an alkyl group;

n represents 5, 7 or 8;

and, where $R_3$ represents a carboxy group, non-toxic salts thereof, the significance of the other symbols $R_1$, $R_2$, $R_3$, $R_4$, $R_5$, n and X being as hereinbefore defined with reference to formula I;

b. non-toxic salts of all those compounds of formula I wherein $R_1$ represents a straight-chain alkyl group containing 2, 3, 4, 6 or 7 carbon atoms, $R_2$ represents a hydrogen atom or an acyl group, $R_3$ represents a carboxy group, $R_4$ represents an oxygen atom, $R_5$ represents a hydrogen atom, n represents 6 and X represents an ethylene group.

c. all those compounds of formula I wherein $R_1$ represents a straight-chain alkyl group containing 2, 3, 4, 6 or 7 carbon atoms, $R_2$ represents a hydrogen atom or an acyl group, $R_4$ represents an oxygen atom, $R_5$ represents a hydrogen atom and n represents 6 and at least one of the symbols $R_3$ and X has a significance as specified below:

$R_3$ represents an alkoxycarbonyl group wherein the alkoxy moiety contains from 4 to 12 carbon atoms;

X represents a trans-vinylene group; the significance of the other symbol $R_3$ or X being as hereinbefore defined with reference to formula I.

Other novel compounds of formula I are compounds specifically described in the present specification which, although they are within the scope disclosed in one or more of the abovementioned patents and patent application of the prior art, have not hitherto been specifically described. These novel compounds are: 7-[5-(3-hydroxyhex-1-enyl)-2-oxocyclopentyl]heptanoic acid, 7-[5-(3-hydroxyhept-1-enyl)-2-oxocyclopentyl]-heptanoic acid, 7-[5-(3-hydroxynon-1-enyl)-2-oxocyclopentyl]heptanoic acid, 7-[5-(3-hydroxydec-1-enyl)-2-oxocyclopentyl]heptanoic acid and 2α-(6-carboxyhexyl)-3β-(3β-hydroxyoct-1-enyl)-cyclopentanone which last compound has not hitherto been described as separated from its diastereoisomer, 2α-(6-carboxyhexyl)-3β-(3α-hydroxyoct-1-enyl)cyclopentanone.

The novel compounds of the present invention possess valuable pharmacological properties including, in particular, the production of hypotension, bronchodilation, inhibition of gastric acid secretion, and stimulation of uterine contraction. In laboratory screening tests the compounds produce:

a. a 10mmHg fall in the mean blood pressure of the urethane-anaesthetised, pempidine-treated normotensive rat at doses between 0.0005 and 2.0 mg/kg animal body weight administered intravenously;

b. a 50 percent inhibition of the bronchoconstriction induced by administration of a bronchoconstrictor agonist, e.g. histamine or 5-hydroxytryptamine, in the urethane-anaesthetised guinea-pig when administered intravenously at doses between 0.005 and 100 µg/kg animal body weight;

c. a 50 percent inhibition of pentagastrin-induced gastric acid secretion in the rat at doses of between 1.0 and 100 µg/kg animal body weight/minute when administered orally in solution in an aqueous sodium chloride solution;

d. a 100 percent increase in amplitude of contraction of the uterus of the pregnant rat when administered intravenously at doses between 0.1 and 10 mg/kg body weight.

Especially useful are those compounds of formula I and, when $R_3$ represents a carboxy group, non-toxic salts thereof, in which $R_1$ is a secondary alkyl group, that is to say $R_1$ is branched at the carbon atom by which it is attached to the group $CHOR_2$, and in particular 7-[5-(3-hydroxy-4-methyloct-1-enyl)-2-oxocyclopentyl]heptanoic acid and its non-toxic salts, which are all novel compounds and which exhibit in particular high bronchodilator activity in association with a reduced level of hypotensive activity, and are therefore particularly useful as bronchodilators in conditions where the production of a hypotensive effect is contraindicated.

Among the other important compounds of the present invention are the following compounds: 7-[5-(3-hydroxy-5-methylhex-1-enyl)-2-oxocyclopentyl]-heptanoic acid, 7-[5-(3-cyclopentyl-3-hydroxyprop-1-enyl)-2-oxocyclopentyl]heptanoic acid, 7-[5-(3-hydroxydodec-1-enyl)-2-oxocyclopentyl]heptanoic acid, 7-[5-(3-hydroxy-5-methyloct-1-enyl)-2-oxocyclopentyl]-heptanoic acid, 7-[5-(3-hydroxy-6-methyloct-1-enyl)-2-oxocyclopentyl]heptanoic acid, 7-[5-(3-hydroxy-7-methyloct-1-enyl)-2-oxocyclopentyl]heptanoic acid, 7-[5-(3-cyclohexyl-3-hydroxyprop-1-enyl)-2-oxocyclopentyl]-heptanoic acid, 7-[5-(3-hydroxy-8-methoxyoct-1-enyl)-2-oxocyclopentyl]heptanoic acid, 7-[5-(3-adamantyl-3-hydroxyprop-1- enyl)-2-oxocyclopentyl]heptanoic acid, 7-[5-(3-cyclopentyl-3-hydroxyprop-1-yl)-2-oxocyclopentyl]-cyclopanoic acid, 7-[5-(3-hydroxyoct-1-enyl)-3-methyl-2-oxocyclopentyl]heptanoic acid, 7-[2-methoxyimino-5-(3-hydroxyoct-1-enyl)cyclopentyl]heptanoic acid, 7-[5-(3-acetoxy-4-methyloct-1-enyl)-2-oxocyclopentyl]-heptanoic acid, methyl 7-[5-(3-cyclohexyl-3-hydroxyprop-1-enyl)-2-oxocyclopentyl]heptanoate, methyl 7-[5-(3-cyclopentyl-3-hydroxyprop-1-enyl)-2-oxocyclopentyl]-heptanoate, methyl 7-[5-(3-hydroxydodec-1-enyl)-2-oxocyclopentyl]heptanoate, N-methyl-7-[5-(3-hydroxydodec-1-enyl)-2-oxocyclopentyl]heptanoamide and heptyl 7-[5-(3-cyclohexyl-3-hydroxyprop-1-enyl)-2-oxocyclopentyl]-heptanoate.

As will be readily appreciated by those skilled in the art, the isomeric forms of the compounds of the invention arising from the aforementioned centres of chirality may be separated by the application or adaptation of known methods, for example diastereoisomeric forms may be separated by chromatography using selective adsorption from solution or from the vapour phase onto suitable adsorbents, and enantiomeric forms of acidic compounds of formula I wherein $R_3$ represents a carboxy group may be separated by formation of salts with an optically active base, followed by separation of the obtained pair of diastereoisomers by, for example, fractional crystallisation from a suitable solvent system, followed by separate regeneration of the enantiomeric acids of formula I.

The following Examples illustrate the present invention.

EXAMPLE 1

7-[5-(3-Hydroxy-4-methyloct-1-enyl)-2-ococyclopentyl]-heptanoic acid i. Preparation of 2-(7-hydroxyheptyl)cyclopent-2-en-1-one A mixture of 7-(2-tetrahydropyranyloxy)heptanal (22 g.) and 1-morpholinocyclopentene, i.e., the morpholine enamine of cyclopentanone, (21.4 g.) in benzene (25 ml.) was heated under reflux for 12 hours under nitrogen, and the water liberated was continuously removed with a Dean and Stark head. Benzene (10 ml.) and then, dropwise, 18 percent hydrochloric acid (28 ml.) were added and the mixture was stirred for 2 hours The organic layer was separated and evaporated. Concentrated hydrochloric acid (72 ml.) and butanol (300 ml.) were added to the residue. The mixture was heated at 100°C. for 1 hour, and then the solution was concentrated to give an oil. Diethyl ether was added, and the ether solution was washed with aqueous sodium bicarbonate and then water, and dried over sodium sulphate. The solvent was evaporated and the residue was distilled under reduced pressure to give 2-(7-hydroxyheptyl)cyclopent-2-en-1-one (11.7 g.), b.p. 125°-170°C/0.15 mm.Hg, $n_D^{25}$ 1.490, $\lambda_{max}$ 228 m$\mu$ (ethanol).

The 7-(2-tetrahydropyranyloxy)heptanol used as starting material in the above procedure was prepared as follows:

3,4-Dihydro-2H-pyran (272 g.) was added dropwise at 40°C. with stirring to a mixture of 7-hydroxyheptanenitrile (284 g.) and concentrated hydrochloric acid (10 drops). The temperature was allowed to rise to 65°C. and was maintained at this level for one hour. The solution was cooled and and benzene (500 ml.) was added. The solution was washed with aqueous sodium bicarbonate and then water, and dried over sodium sulphate. The solvent was removed in vacuo, and the residue distilled under reduced pressure to give 7-(2-tetrahydropyranyloxy)-heptanenitrile (411 g.), b.p. 100°-130°C./0.1 mm.Hg, $n_D^{25}$ 1.455.

Diisobutylaluminium hydride (19.4 g.) in dry benzene (50 ml.) was added dropwise at 10°C. to a stirred solution of 7-(2-tetrahydropyranyloxy)-heptanenitrile (20.6 g.) in dry diethyl ether (200 ml.). The solution was stirred at 10°C. for 30 minutes and was then added to 2N aqueous sulphuric acid (300 ml.) at 0°C. The mixture was heated at 30°C. for 30 minutes, and then saturated with sodium chloride and the layers were separated. The aqueous layer was extracted with diethyl ether and the combined organic layers were washed with aqueous sodium bicarbonate, and then aqueous sodium chloride, and dried over sodium sulphate. The solvent was evaporated and the residue was distilled under reduced pressure to give 7-(2-tetrahydropyranyloxy)-heptanal (12.7 g.) b.p. 78°-106°C./0.1 mm.Hg, $n_D^{25}$ 1.456.

The above procedure may also be carried out replacing the 7-(2-tetrahydropyranyloxy)heptanal by 7-hydroxyheptanal (prepared as described above for 7-(2-tetrahydropyranyloxy)heptanal, but using 7-hydroxyheptanenitrile in place of 7-(2-tetrahydropyranyloxy)-heptanenitrile].

Advantageously, 7-hydroxyheptanal can be prepared in one step from aleuritic acid using the method described below.

Sodium hydroxide (13.2 g.) in water (660 ml.) was added to aleuritic acid (100 g.) and the suspension stirred at 0° to 10°C. To the resulting suspension of sodium aleuritate was added sodium periodate (80 g.) in water (800 ml.) over 1 hour, without allowing the temperature to rise above 15°C. Dichloromethane (200 ml.) was then added and the mixture stirred for a further 2.5 hours at 15°C. A further amount of dichloromethane (300 ml.) and saturated aqueous sodium bicarbonate (100 ml.) were added and the mixture vigorously stirred. The precipitated sodium iodate was removed by filtration and the dichloromethane layer separated. The aqueous phase was washed with dichloromethane (500 ml.) and the combined dichloromethane extracts dried over anhydrous magnesium sulphate. Removal of the dichloromethane in vacuo below 40°C. gave 7-hydroxyheptanal (43 g.), $\nu_{max}$ 3400 cm$^{-1}$, 2700 cm$^{-1}$, 1710 cm$^{-1}$.

ii. Preparation of 2-(7-hydroxyheptyl)-3-oxocyclopentanecarbonitrile

A mixture of 2-(7-hydroxyheptyl)cyclopent-2-en-1-one (17 g.), acetone cyanohydrin (8.5 g.), 6 percent aqueous sodium carbonate (8 ml.) and methanol (50 ml.) was stirred and heated under reflux for 4 hours. Methanol was removed in vacuo, water (100 ml.) was added and the mixture was extracted with diethyl ether and dried over magnesium sulphate. The solvent was removed by evaporation, and the residue was distilled under reduced pressure to give 2-(7-hydroxyheptyl)-3-oxocyclopentanecarbonitrile (13.3 g.), b.p. 144°-182°C./0.15 mm.Hg, $n_D^{25}$ 1.4795.

iii. Preparation of 7-cyano-6-(7-hydroxyheptyl)-1,4-dioxaspiro[4,4]nonane

A mixture of 2-(7-hydroxyheptyl)-3-oxocyclopentanecarbonitrile (20 g.), ethylene glycol (5.6 g.), p-toluenesulphonic acid (1 g.) and benzene (160 ml.) was heated to reflux for 3½ hours with continuous removal of water. The mixture was cooled to ambient temperature, anhydrous sodium carbonate was added, and after filtration through a bed of sodium carbonate, the solvent was removed under reduced pressure. The residue was distilled under reduced pressure to give 7-cyano-6-(7-hydroxyheptyl)-1,4-dioxaspiro[4,4]nonane (19.3 g.), b.p. 166°–182°C./0.1 mm.Hg. This material was used as a starting material in the next stage, an aliquot being redistilled to b.p. 177°–179°C./0.1 mm.Hg for elemental analysis.

Found: C, 67.1; H, 9.2; N, 4.89%;
$C_{15}H_{25}NO_3$ requires: C, 67.37; H, 9.42; N, 5.24%.

iv. Preparation of 7-formyl-6-(7-hydroxyheptyl)-1,4-dioxaspiro[4,4]nonane

A solution of diisobutylaluminum hydride (53 g.) in dry benzene (145 ml.) was added, with rapid stirring, to a solution of 7-cyano-6-(7-hydroxyheptyl)-1,4-dioxaspiro[4,4]nonane (43.2 g.) in dry diethyl ether (432 ml.) at 10°–15°C. Stirring at ambient temperature was continued for 1½ hours and the mixture was added to 2N aqueous acetic acid (1 litre) at a temperature lower than 15°C. The organic phase was separated and the aqueous layer was extracted with diethyl ether. The combined organic phases were washed with aqueous sodium bicarbonate, dried over sodium sulphate, the solvents removed in vacuo and the residue distilled under reduced pressure to give 7-formyl-6-(7-hydroxyheptyl)-1,4-dioxaspiro[4,4]nonane (25.3 g.), b.p. 164°–200°C./0.04–0.05 mm.Hg. $\nu_{max}$ 1710 cm$^{-1}$, 2700 cm$^{-1}$ (liquid film).

v. Preparation of 6-(7-hydroxyheptyl)-1,4-dioxa-7-(3-oxo-4-methyloct-1-enyl)spiro[4,4]nonane.

A mixture of 7-formyl-6-(7-hydroxyheptyl)-1,4-dioxaspiro[4,4]nonane (3.88 g.) and 2-methylhexanoylmethylenetriphenylphosphorane (6.0 g.) in dry tetrahydrofuran (30 ml.) was heated to reflux under nitrogen for 18 hours. The solvent was removed in vacuo and the residue triturated with petroleum ether (b.p. 60°–80°C.), allowed to stand at 0°C., filtered to remove triphenylphosphine oxide and the filtrate evaporated to give 6-(7-hydroxyheptyl)-1,4-dioxa-7-(3-oxo-4-methyloct-1-enyl)spiro[4,4]nonane (5.56 g.), $\nu_{max}$ 1620 cm$^{-1}$, 1660 cm$^{-1}$. This material was used for the next step, the preparation of 7-{1,4-dioxa-7-(3-oxo-4-methyloct-1-enyl)spiro[4,4]non-6-yl}heptanoic acid, without further purification being necessary.

2-Methylhexanoylmethylenetriphenylphosphorane, used as starting material, was prepared as follows:

A solution of 1-chloro-3-methylheptan-2-one (49.4 g.) and triphenylphosphine (79.5 g.) in chloroform (250 ml.) was saturated with nitrogen and refluxed under nitrogen overnight. The chloroform was removed in vacuo and the residue (crude 2-oxo-3-methylheptyltriphenylphosphonium chloride) was added portionwise to a solution of sodium carbonate (109 g.) in water (1500 ml.) and the mixture was stirred vigorously for 24 hours. The solution was extracted with diethyl ether, and the ethereal extracts were dried over magnesium sulphate. The solvent was removed by evaporation and the residue was cooled and triturated with petroleum ether (b.p. 60°–80°C.) to give 2-methylhexanoylmethylenetriphenylphosphorane (35.2 g.), m.p. 107°–109°C.

1-Chloro-3-methylheptan-2-one, used as starting material, was prepared as follows:

2-Methylhexanoyl chloride (42.5 g.) was added dropwise at −40°C. to a solution of diazomethane (24 g.) in diethyl ether (600 ml.) and the solution was stirred for 1 hour at ambient temperature. Hydrogen chloride gas was then bubbled into the solution until it was fully saturated. Crushed ice was added to give approximately 1 litre of aqueous solution. The organic layer was separated and the aqueous layer was extracted with diethyl ether. The combined organic layers were dried over magnesium sulphate, evaporated, and the residue distilled under reduced pressure to give 1-chloro-3-methylheptan-2-one (49.5 g.), b.p. 100°–110°C./13 mm.Hg.

vi. Preparation of 7-{1,4-dioxa-7-(3-oxo-4-methyloct-1-enyl)spiro[4,4]non-6-yl}heptanoic acid Chromium trioxide (6.0 g.) (dried over phosphorus pentoxide) was added portionwise with stirring to a solution of 6-(7-hydroxyheptyl)-1,4-dioxa-7-(3-oxo-4-methyloct-1-enyl)spiro[4,4]nonane (5.56 g.) in dry dimethylformamide (70 ml.) at a temperature lower than 0°C. Concentrated sulphuric acid (2 ml.) in dimethylformamide (70 ml.) was added and the mixture stirred at below 10°C. for 1 hour. Diethyl ether was added followed by a minimum quantity of water to produce two readily separable layers. The ether layer was separated and stirred with aqueous 2N sodium carbonate solution. The aqueous layer was separated, washed with diethyl ether, and then covered with a layer of diethyl ether and acidified to pH4 by the dropwise addition of concentrated hydrochloric acid. The ethereal layer was separated and the aqueous layer again extracted with diethyl ether. The combined ethereal layers were dried over sodium sulphate and evaporated to give crude 7-{1,4-dioxa-7-(3-oxo-4-methyloct-1-enyl)spiro[4,4]-non-6-yl}heptanoic acid (1.4 g.), $\nu_{max}$ 1620 cm$^{-1}$, 1660 cm$^{-1}$, 1700 cm$^{-1}$. This material was used for the next step, the preparation of 7-[5-(3-hydroxy-4-methyloct-1-enyl)-2-oxocyclopentyl]heptanoic acid, without further purification being necessary.

vii. Preparation of 7-[5-(3-hydroxy-4-methyloct-1-enyl)-2-oxocyclopentyl]heptanoic acid A solution of sodium borohydride (0.07 g.) in 0.2N aqueous sodium hydroxide (0.7 ml.) was added dropwise to a solution of 7-{1,4-dioxa-7-(3-oxo-4-methyloct-1-enyl)spiro[4,4]non-6-yl} heptanoic acid (0.7 g.) in ethanol (10 ml.) and N sodium hydroxide (0.65 ml.). The resulting solution was stirred for 4.5 hours and then the ethanol removed in vacuo. Water (10 ml.) was added, the solution washed with diethyl ether and the aqueous layer was covered with a layer of diethyl ether and acidified to pH1 by the dropwise addition of concentrated hydrochloric acid. The ether layer was separated and the aqueous layer was extracted twice more with diethyl ether. The combined ether extracts were dried over magnesium sulphate and the solvent evaporated. A mixture of the residue and 2N hydrochloric acid (10 ml.) was heated to 65°–75°C. with stirring for 1.2 hours. The cooled mixture was extracted twice with diethyl ether and the combined extracts dried (magnesium sulphate) and evaporated. The residue was purified by preparative thin-layer chromatography on silica gel using a 65:15:1 mixture of benzene, dioxane and acetic acid as eluent to give 7-[5-(3-hydroxy-4-methyloct-1-enyl)-2-oxocyclopentyl]heptanoic acid (0.33 g.)

Elemental analysis:

Found: C, 71.8; H, 10.2%;
$C_{21}H_{38}O_4$ requires: C, 71.6; H, 10.3%
$\nu_{max}$ 980 cm$^{-1}$, 1700 cm$^{-1}$, 1720 cm$^{-1}$.

EXAMPLE 2

7-[5-(3-Hydroxyoct-1-enyl)-2-oxocyclopentyl]heptanoic acid i. Preparation of 6-(7-hydroxyheptyl)-1,4-dioxa-7-(3-oxoct-1-enyl)spiro[4,4]nonane A mixture of 7-formyl-6-(7-hydroxyheptyl)-1,4-dioxaspiro[4,4]nonane (69.) prepared as described in Example 1) and hexanoylmethylenetriphenylphosphorane (8.5 g.) in dry tetrahydrofuran (50 ml.) was heated to reflux under nitrogen for 16 hours. The solvent was removed in vacuo and the residue triturated with petroleum ether (b.p. 60°–80°C.), cooled to 0°C. for 1 day, filtered to remove triphenylphosphine oxide and the filtrate evaporated. The residue was again triturated with petroleum ether (b.p. 60°–80°C.) to remove further triphenylphosphine oxide, filtered and evaporated to give 6-(7-hydroxyheptyl)-1,4-dioxa-7-(3-oxooct-1-enyl)-spiro[4,4]nonane (7.5 g.), $v_{max.}$ 1620 cm$^{-1}$, 1660 cm$^{-1}$.

Hexanoylmethylenetriphenylphosphorane, used as starting material, was prepared as follows:

A solution of 1-chloroheptan-2-one (33 g.) and triphenylphsophine (60 g.) in chloroform (50 ml.) was saturated with nitrogen and refluxed under nitrogen overnight. The chloroform was removed in vacuo and the residue was dissolved in dichloromethane (150 ml.). Dry diethyl ether (600 ml.) was added to precipitate 2-oxoheptyltriphenylphosphonium chloride (60 g.) m.p. 165°–168°C. This compound (23 g.) was added portionwise to a solution of sodium carbonate (25 g.) in water (250 ml.) and the mixture was stirred vigorously for 24 hours. The solution was extracted with diethyl ether, and the ethereal extracts were dried over magnesium sulphate. The solvent was removed by evaporation and the residue was cooled and triturated with petroleum ether (b.p. 40°–60°C.). The solid thus obtained was recrystallised from petroleum ether (b.p. 60°–80°C.) to give nexanoylmethylenetriphenylphosphorane (17 g.), m.p. 73°–74°C.

ii Preparation of 7-{1,4-dioxa-7-(3-oxooct-1-enyl)-spiro[4,4]non-6-yl}heptanoic acid Chromium trioxide (2.80 g.) (dried over phosphorus pentoxide) was added portionwise with stirring to a solution of 6-(7-hydroxyheptyl)-1,4-dioxa-7-(3-oxooct-1-enyl)spiro[4,4]nonane (2.5 g.) in dry dimethylformamide (40 ml.) at a temperature lower than 0°C. Concentrated sulphuric acid (1 ml.) in dimethylformamide (30 ml.) was added and the mixture stirred at below 0°C. for 15 minutes. Diethyl ether (50 ml.) was added followed by a minimum quantity of water to produce two readily separable layers. The ether layer was separated, dried over magnesium sulphate and evaporated to give crude 7-{1,4-dioxa-7-(3-oxooct-1-enyl)spiro[4,4]non-6-yl}heptanoic acid (2.23 g.). This material was used for the next step, the preparation of 7-[5-(3-hydroxyoct-1-enyl)-2-oxocyclopentyl]heptanoic acid, without further purification being necessary.

iii. Preparation of 7-[5-(3-hydroxyoct-1-enyl)-2-oxocyclopentyl]heptanoic acid

A solution of sodium borohydride (0.54 g.) in 0.2N aqueous sodium hydroxide (5.4 ml.) was added dropwise to a solution of 7-{1,4-dioxa-7-(3-oxooct-1-enyl)spiro[4,4]non-6-yl} heptanoic acid (2.23 g.) in ethanol (54 ml) and N sodium hydroxide (5.4 ml.). The resulting solution was stirred for 1 day and then the ethanol removed in vacuo. The aqueous layer was covered with a layer of diethyl ether and acidified to pH1 by the dropwise addition of concentrated hydrochloric acid. The ether layer was separated and the aqueous layer was extracted twice more with diethyl ether. The combined ether extracts were dried over magnesium sulphate and the solvent evaporated. A mixture of the residue (1.09 g.), water (5 ml.) and 2N hydrochloric acid (10 ml.) was heated to 50°C. with stirring for 3 hours. The cooled mixture was extracted twice with diethyl ether and the combined extracts dried (magnesium sulphate) and evaporated. The residue (0.89 g.) was purified by preparative thin-layer chromatography on silica gel using a 65:15:1 mixture of benzene, dioxane and acetic acid as eluent to give 7-[5-(3-hydroxyoct-1-enyl)-2-oxocyclopentyl]heptanoic acid, (0.7 g.).

Elemental analysis:

Found: C, 70.7; H, 10.0%;
$C_{20}H_{34}O_4$ requires: C, 70.96; H, 10.12%;
$v_{max.}$ 980 cm$^{-1}$, 1700 cm$^{-1}$, 1720 cm$^{-1}$.

EXAMPLE 3

7-[5-(3-Hydroxy-5-methylhex-1-enyl)-2-oxocyclopentyl]-heptanoic acid i. Preparation of 6-(7-hydroxyheptyl)-7-(5-methyl-3-oxohex-1-enyl)-1,4-dioxaspiro[4,4]nonane In a similar manner to that described above in Example 2(i) for the preparation of 6-(7-hydroxyheptyl)-1,4-dioxa-7-(3-oxooct-1-enyl)spiro[4,4]nonane, but substituting the appropriate quantity of 3-methylbutyrylmethylenetriphenylphosphorane for the hexanoylmethylenetriphenylphosphorane, there was prepared crude 6-(7-hydroxyheptyl)-7-(5-methyl-3-oxohex-1-enyl)-1,4-dioxaspiro[4,4]nonane. This material was used for the next step, the preparation of 7-{7-(5-methyl-3-oxooct-1-enyl)-1,4-dioxaspiro[4,4]non-6-yl}heptanoic acid, without further purification being necessary.

The 3-methylbutyrylmethylenetriphenylphosphorane [m.p. 114°–116°C., $v_{max.}$ 1540 cm$^{-1}$, 1440 cm$^{-1}$, 1400 cm$^{-1}$, 1105 cm$^{-1}$, (KBr disc).

Elemental anaylsis:-

Found: C, 80.3; H, 7.2%;
$C_{24}H_{25}OP$ requires: C, 80.0; H, 7.0%]

used as a starting material in the above preparation, was prepared in a similar manner to that described above in Example 2(i) for the preparation of hexanoylmethylenetriphenylphosphorane, but substituting 1-chloro-4-methylpentan-2-one (prepared according to the method described by Azinger et al, Annalen, (1964), 672, 156) for the 1-chloroheptan-2-one. (The melting point of the intermediate 4-methyl-2-oxopentyltriphenylphosphonium chloride was 208°C.).

ii. Preparation of 7-{7-(5-methyl-3-oxohex-1-enyl)-1,4-dioxaspiro[4,4]non-6-yl}heptanoic acid In a similar manner to that described above in Example 2(ii) for the preparation of 7-{1,4-dioxa-7-(3-oxooct-1-enyl)spiro[4,4]non-6-yl} heptanoic acid, but substituting the appropriate quantity of 6-(7-hydroxyheptyl)-7-(5-methyl-3-oxohex-1-enyl)-1,4-dioxaspiro[4,4]nonane for the 6-(7-hydroxyheptyl)-1,4-dioxa-7-(3-oxooct-1-enyl)spiro[4,4]nonane, there was prepared 7-{7-(5-methyl-3-oxohex-1-enyl)-1,4-dioxaspiro[4,4]-non-6-yl}heptanoic acid.

iii. Preparation of 7-[5-(3-hydroxy-5-methylhex-1-enyl)-2-oxocyclopentyl]heptanoic acid In a similar manner to that described above in Example 2(iii) for the preparation of 7-[5-(3-hydroxyoct-1-enyl)-2-oxocyclopentyl]heptanoic acid, but substituting the appropriate quantity of 7-{7-(5-methyl-3- oxohex-1-enyl)-1,4-dioxaspiro[4,4]non-6-yl}heptanoic acid for the 7-{1,4-dioxa-7-(3-oxooct-1-enyl)spiro[4,4]-non-6-yl} heptanoic acid, there was prepared 7-[5-(3-hydroxy-5-methylhex-1-enyl)-2-oxocyclopentyl]heptanoic acid, $\nu_{max}$. 980 cm$^{-1}$, 1700 cm$^{-1}$, 1720 cm$^{-1}$, NMR (approximately 10 percent solution in deuterochloroform); doublet at 0.98 (J = 6 cycles/second), multiplets at 1.55δ, 2.0–2.6δ, 5.6δ, broad multiplet at 3.76–4.15δ, singlet at 7.45δ.

Elemental analysis:

| Found: | C, 69.9; | H, 9.7%; |
| --- | --- | --- |
| C$_{19}$H$_{32}$O$_4$ | requires: | C, 70.3; | H, 9.9%. |

EXAMPLE 4

7-[5-(3-Cyclopentyl-3-hydroxyprop-1-enyl)-2-oxocyclopentyl]heptanoic acid i. Preparation of 7-(3-cyclopentyl-3-oxoprop-1-enyl)-6-(7-hydroxyheptyl)-1,4-dioxaspiro[4,4]nonane In a similar manner to that described above in Example 2(i) for the preparation of 6-(7-hydroxyheptyl)-1,4-dioxa-7-(3-oxooct-1-enyl)spiro[4,4]nonane, but substituting the appropriate quantity of cyclopentylcarbonylmethylenetriphenylphosphorane for the hexanoylmethylenetriphenylphosphorane, there was prepared crude 7-(3-cyclopentyl-3-oxoprop-1-enyl)-6-(7-hydroxyheptyl)-1,4-dioxaspiro[4,4]nonane. This material was used for the next step, the preparation of 7-{7-(3-cyclopentyl-3-oxoprop-1-enyl)-1,4-dioxaspiro[4,4]-non-6-yl}heptanoic acid, without further purification being necessary.

The cyclopentylcarbonylmethylenetriphenylphosphorane [m.p. 158°–160°C., $\nu_{max}$. 1530 cm$^{-1}$, 1440 cm$^{-1}$, 1400 cm$^{-1}$, 1110 cm$^{-1}$ (KBr disc).

Elemental analysis:

| Found: | C, 81.1; | H, 6.9%; |
| --- | --- | --- |
| C$_{25}$H$_{23}$OP | requires: | C, 80.6; | H, 6.7%]. | used in the above preparation, was prepared in a similar manner to that described above in Example 2(i) for the preparation of hexanoylmethylenetriphenylphosphorane, but substituting chloromethyl cyclopentyl ketone [prepared according to the method described by Mousseron et al, Bull. Soc. Chim. France, (1952), 767 and Comptes Rendus (1951) 232, 1562, with the modification of using hydrogen chloride gas instead of concentrated hydrochloric acid] for the 1-chloroheptan-2-one. (The melting point of the intermediate 2-cyclopentyl-2-oxoethyltriphenylphosphonium chloride was 160°C.).

ii. Preparation of 7-{7-(3-cyclopentyl-3-oxoprop-1-enyl)-1,4-dioxaspiro[4,4]non-6-yl}heptanoic acid In a similar manner to that described above in Example 2(ii) for the preparation of 7-{1,4-dioxa-7-(3-oxooct-1-enyl)spiro[4,4]non-6-yl} heptanoic acid, but substituting the appropriate quantity of 7-(3-cyclopentyl-3-oxoprop-1-enyl)-6-(7-hydroxyheptyl)-1,4-dioxaspiro[4,4]nonane for the 6-(7-hydroxyheptyl)-1,4-dioxa-7-(3-oxooct-1-enyl)spiro[4,4]nonane, there was prepared 7-{7-(3-cyclopentyl-3-oxoprop-1-enyl)-1,4-dioxaspiro[4,4]-non-6-yl}heptanoic acid. This material was used for the next step, the preparation of 7-[5-(3-cyclopentyl-3-hydroxyprop-1-enyl)-2-oxocyclopentyl]-heptanoic acid, without further purification being necessary.

iii. Preparation of 7-[5-(3-cyclopentyl-3-hydroxyprop-1-enyl)-2-oxocyclopentyl]heptanoic acid In a similar manner to that described above in Example 2(iii) for the preparation of 7-[5-(3-hydroxyoct-1-enyl)-2-oxocyclopentyl]heptanoic acid, but substituting the appropriate quantity of 7-{7-(3-cyclopentyl-3-oxoprop-1-enyl)-1,4-dioxaspiro[4,4]non-6-yl}-heptanoic acid for the 7-{1,4-dioxa-7-(3-oxooct-1-enyl)-spiro[4,4]non-6-yl} heptanoic acid, there was prepared 7-[5-(3-cyclopentyl-3-hydroxyprop-1-enyl)-2-oxocyclopentyl]heptanoic acid, $\nu_{max}$. 1725 cm$^{-1}$, 1700 cm$^{-1}$, 980 cm$^{-1}$.

Elemental analysis:

| Found: | C, 71.1; | H, 9.4%; |
| --- | --- | --- |
| C$_{20}$H$_{32}$O$_4$ | requires: | C, 71.4; | H, 9.5%. |

EXAMPLE 5

The 7-[5-(3-hydroxy-4-methyloct-1-enyl)-2-oxocyclopentyl]heptanoic acid (0.30 g.), prepared as described in Example 1, was further purified and separated into two diastereoisomeric components by preparative thin-layer chromatography on silica gel using a 40:40:1 mixture by volume of ethyl acetate, cyclohexane and formic acid as the eluent. The chromatogram was eluted with the solvent mixture four times, allowing it to dry at room temperature after each elution. The positions of the two bands were then detected by spraying a small strip of the chromatogram with a solution of phosphomolybdic acid in ethanol (10 percent w/v) and the remainder of each band was then removed from the supporting glass plate and extracted with diethyl ether using a Soxhlet apparatus. Evaporation to dryness of the ether extracts gave two diastereoisomeric components of 7-[5-(3-hydroxy-4-methyloct-1-enyl)-2-oxocyclopentyl]-heptanoic acid, designated "component 5a" (closer to the origin on the chromatogram; 80 mg.) and "component 5b" (further from the origin on the chromatogram; 70 mg.) respectively. NMR data for component 5a (approximately 10 percent solution in deuterochloroform) included multiplets at 0.65–1.05δ, 1.05–2.7δ, 3.75–4.2δ, 5.45–5.70δ and a singlet at 4.96δ.

The NMR data for component 5b were sensibly identical except that the singlet (attributed to hydrogen atoms in hydroxy and carboxy groups) occurred at 5.1δ instead of at 4.96δ.

EXAMPLE 6

By proceeding in a manner similar to that described in Example 5 and using an identical solvent mixture as eluent, 7-[5-(3-hydroxyoct-1-enyl)-2-oxocyclopentyl]-heptanoic acid (0.30 g.), prepared as described in Example 2, was separated into two components (presumed to be diastereoisomeric pairs of enantiomers) by preparative thin-layer chromatography on silica gel, designated "component 6a" (further from the origin in the chromatogram; 50 mg.) and "component 6b" (closer to the origin in the chromatogram; 40 mg.) respectively.

The NMR data for the two components were sensibly identical (approximately 10 percent solution in deuterochloroform):- multiplets at 1.05–2.0δ, 2.0–2.7δ, 3.85–4.3δ and 5.45–5.70δ, singlet at 6.65δ, and a triplet at 0.89δ.

One component was the novel diastereoisomer, 2α-(6-carboxyhexyl)-3β-(3β-hydroxyoct-1-enyl)cyclopentanone, and one component was the known diastereoisomer, 2α-(6-carboxyhexyl)-3β-(3α-hydroxyoct-1-enyl)cyclopentanone.

EXAMPLE 7

7-(5-(3-Hydroxynon-1-enyl)-2-oxocyclopentyl]heptanoic acid i. Preparation of 6-(7-hydroxyheptyl)-1,4-dioxa-7-(3-oxonon-1-enyl)spiro[4,4]nonane By proceeding in a similar manner to that described in Example 1(v) for the preparation of 6-(7-hydroxyheptyl)-1,4-dioxa-7-(3-oxo-4-methyloct-1-enyl)-spiro[4,4]nonane, but substituting the appropriate quantity of heptanoylmethylenetriphenylphosphorane for the 2-methylhexanoylmethylenetriphenylphosphorane used as a starting material, there was prepared crude 6-(7-hydroxyheptyl)-1,4-dioxa-7-(3-oxonon-1-enyl)-spiro[4,4]nonane, pure enough for use as starting material in the preparation of 7-{1,4-dioxa-7-(3-oxonon-1-enyl)-spiro[4,4]non-6-yl} heptanoic acid hereinafter described.

The heptanoylmethylenetriphenylphosphorane (m.p. 87°–88°C., elemental analysis:

Found:      C, 79.9;    H, 7.5%;
$C_{26}H_{29}OP$  requires:    C, 80.7;    H, 7.45%).

used as a starting material in the above preparation, was prepared in a similar manner to that described in Example 1(v) for the preparation of 2-methylhexanoylmethylenetriphenylphosphorane, but substituting the appropriate quantity of 1-chlorooctan-2-one (prepared as described by Archer, Unser and Froelich, J. Amer. Chem. Soc., 1956, 78, 6182) for the 1chloro-3-methylheptan-2-one used as a starting material. The melting point of the intermediate 2-oxooctyltriphenylphosphonium chloride was 179°–181°C.

ii. Preparation of 7-{1,4-dioxa-7-(3-oxonon-1-enyl)-spiro[4,4]non-6-yl}heptanoic acid By proceeding in a similar manner to that described in Example 1(vi) for the preparation of 7-{1,4-dioxa-7-(3-oxo-4-methyloct-1-enyl)spiro[4,4]non-6-yl}-heptanoic acid, but substituting the appropriate quantity of 6-(7-hydroxyheptyl)-1,4-dioxa-7-(3-oxonon-1-entyl)-spiro[4,4]nonane for the 6-(7-hydroxyheptyl)-1,4-dioxa-7-(3-oxo-4-methyloct-1-enyl)spiro[4,4]nonane used as a starting material, there was prepared 7-{1,4-dioxa-7-(3-oxonon-1-enyl)spiro[4,4]non-6-yl} heptanoic acid, $\nu_{max}$ 1620 cm$^{-1}$, 1660 cm$^{-1}$, 1700 cm$^{-1}$.

iii. Preparation of 7-[5-(3-hydroxynon-1-enyl)-2-oxocyclopentyl]heptanoic acid

By proceeding in a similar manner to that described in Example 1(vii) for the preparation of 7-[5-(3-hydroxy-4-methyloct-1-enyl)-2-oxocyclopentyl]-heptanoic acid, but substituting the appropriate quantity of 7-{1,4-dioxa-7-(3-oxonon-1-enyl)spiro[4,4]-non-6-yl}-heptanoic acid for the 7-{1,4-dioxa-7-(3-oxo-4-methyloct-1-enyl)spiro[4,4]non-6-yl}heptanoic acid used as a starting material, there was prepared 7-[5-(3-hydroxynon-1-enyl)-2-oxocyclopentyl]heptanoic acid.

Elemental analysis:

Found:      C, 71.3;    H, 10.3%;
$C_{21}H_{36}O_4$  requires:    C, 71.6;    H, 10.3%;
$\nu_{max}$ 980 cm$^{-1}$, 1705 cm$^{-1}$, 1725 cm$^{-1}$;

NMR (approximately 10 percent solution in deuterochloroform:- triplet at 0.9δ(J = 5.5 cycles/second), multiplets at 1.05–2.0δ, 2.0–2.7δ, 3.9–4.4δ, 5.25–5.75δ and a broad singlet at 7.04δ.

EXAMPLE 8

By proceeding in a manner similar to that hereinbefore described in Example 2(iii) for the preparation of 7-[5-(3-hydroxyoct-1-enyl)-2-oxocyclopentyl]-heptanoic acid, but substituting the 7-{1,4-dioxa-7-(3-oxooct-1-enyl)spiro[4,4]non-6-yl}heptanoic acid used as starting material by the appropriate quantities of 7-{1,4-dioxa-7-(3-oxodec-1-enyl)spiro[4,4]non-6-yl}-heptanoic acid,
7-{1,4-dioxa-7-(3-oxododec-1-enyl)spiro[4,4]non-6-yl}-heptanoic acid,
7-{1,4-dioxa-7-(3-oxohept-1-enyl)spiro[4,4]non-6-yl}-heptanoic acid,
7-{1,4-dioxa-7-(3-oxohex-1-enyl)spiro[4,4]non-6-yl}-heptanoic acid,
7-{7-(5-methyl-3-oxooct-1-enyl)-1,4-dioxaspiro[4,4]non-6-yl}heptanoic acid,
7-{7-(6-methyl-3-oxooct-1-enyl)-1,4-dioxaspiro[4,4]non-6-yl}heptanoic acid,
7-{7-(7-methyl-3-oxooct-1-enyl)-1,4-dioxaspiro[4,4]non-6-yl}heptanoic acid,
7-{7-(3-cyclohexyl-3-oxoprop-1-enyl)-1,4-dioxaspiro[4,4]-non-6-yl}heptanoic acid, and
7-{7-(8-methoxy-3-oxooct-1-enyl)-1,4-dioxaspiro[4,4]-non-6-yl} heptanoic acid respectively (which were prepared as hereinafter described), there were prepared 7-[5-(3-hydroxydec-1-enyl)-2oxocyclopentyl]heptanoic acid [$\nu_{max}$ 980 cm$^{-1}$, 1700 cm$^{-1}$, 1725 cm$^{-1}$; NMR (approximately 10 percent solution in deuterochloroform): triplet at 0.86δ (J = 5.0 cycles/second), multiplets at 1.05–2.05δ, 2.05–2.70δ, 3.85–4.25δ, 5.45–5.70δ, and a singlet at 6.10δ; elemental analysis:

Found:      C, 72.4;    H, 10.4%;
$C_{22}H_{38}O_4$  requires    C, 72.2;    H, 10.4%].

7-[5-(3-hydroxydodec-1-enyl)-2-oxocyclopentyl]heptanoic acid [$\nu_{max}$ 980 cm$^{-1}$, 1700 cm$^{-1}$, 1720 cm$^{-1}$; NMR (approximately 10 percent solution in deuterochloroform): triplet at 0.89δ (J = 5.5 cycles/second), multiplets at 1.55δ, 2.0–2.7δ, 5.57δ, broad multiplet at 4.15δ, and singlet at 6.5δ; elemental analysis:

Found:      C, 73.0;    H, 10.6%;
$C_{24}H_{42}O_4$  requires    C, 73.1;    H, 10.7%].

7-[5-(3-hydroxyhept-1-enyl)-2-oxocyclopentyl]heptanoic acid [$\nu_{max}$ 970 cm$^{-1}$, 1700 cm$^{-1}$, 1720 cm$^{-1}$, NMR (approximately 10 percent solution in deuterochloroform): triplet at 0.9δ (J = 5.0 cycles/second), multiplets at 1.05–2.0δ, 2.0–2.7δ, 3.85–4.25δ, 5.45–5.70δ and a singlet at 6.99δ; elemental analysis:

Found:      C, 71.0;    H, 9.5%;
$C_{19}H_{32}O_4$  requires    C, 70.5;    H, 9.9%].

7-[5-(3-hydroxyhex-1-enyl)-2-oxocyclopentyl]heptanoic acid [$\nu_{max}$. 980 cm$^{-1}$, 1700 cm$^{-1}$, 1720 cm$^{-1}$; NMR (approximately 10 percent solution in deuterochloroform): triplet at 0.9δ (J = 5.5 cycles/second), multiplets at 1.1–2.1δ, 2.0–2.6δ, 5.55δ, broad multiplet at 3.8–4.3δ, and singlet at 7.1δ; elemental analysis:

| Found: | C, 69.4; | H, 9.8%; | |
|---|---|---|---|
| C$_{18}$H$_{30}$O$_4$ | requires | C, 69.8; | H, 9.7%]. |

7-[5-(3-hydroxy-5-methyloct-1-enyl)-2-oxocyclopentyl]-heptanoic acid [$\nu_{max}$. 980 cm$^{-1}$, 1700 cm$^{-1}$, 1720 cm$^{-1}$; NMR (approximately 10 percent solution in deuterochloroform): triplet at 0.88δ, doublet at 0.91δ, multiplets at 1.0–2.0δ, 2.0–2.5δ, 5.52δ, broad multiplet at 4.1δ, and singlet at 6.25δ; elemental analysis:

| Found: | C, 71.6; | H, 10.4%; | |
|---|---|---|---|
| C$_{21}$H$_{36}$O$_4$ | requires | C, 71.6; | H, 10.3%]. |

7-[5-(3-hydroxy-6-methyloct-1-enyl)-2-oxocyclopentyl]-heptanoic acid [$\nu_{max}$. 980 cm$^{-1}$, 1700 cm$^{-1}$, 1720 cm$^{-1}$; NMR (approximately 10 percent solution in deuterochloroform): multiplets at 0.7–1.05δ, 1.05–2.7δ, 5.5–5.7δ, broad multiplet at 4.11δ, and singlet at 6.85δ; elemental analysis:

| Found: | C, 71.2; | H, 10.6%; | |
|---|---|---|---|
| C$_{21}$H$_{36}$O$_4$ | requires | C, 71.6; | H, 10.3%]. |

7-[5-(3-hydroxy-7-methyloct-1-enyl)-2-oxocyclopentyl]-heptanoic acid [$\nu_{max}$. 980 cm$^{-1}$, 1700 cm$^{-1}$, 1720 cm$^{-1}$; NMR (approximately 10 percent solution in deuterochloroform): doublet at 0.9δ (J = 5.7 cycles/second), multiplets at 1.05–2.0δ, 2.0–2.7δ, 5.66δ, broad multiplet at 4.15δ, and singlet at 6.58δ; elemental analysis:

| Found: | C, 71.2; | H, 10.1%. | |
|---|---|---|---|
| C$_{21}$H$_{36}$O$_4$ | requires | C, 71.6; | H, 10.3%]. |

7-[5-(3-cyclohexyl-3-hydroxyprop-1-enyl)-2-oxocyclopentyl]-heptanoic acid [$\nu_{max}$. 980 cm$^{-1}$, 1700 cm$^{-1}$, 1725 cm$^{-1}$; elemental analysis:

| Found: | C, 71.2; | H, 10.39%; | |
|---|---|---|---|
| C$_{21}$H$_{34}$O$_4$ ¼H$_2$O | requires | C, 71.1; | H, 9.7%] and |

7-[5-(3-hydroxy-8-methoxyoct-1-enyl)-2-oxocyclopentyl]-heptanoic acid [$\nu_{max}$. 980 cm$^{-1}$, 1700 cm$^{-1}$, 1720 cm$^{-1}$; NMR (approximately 10 percent solution in deuterochloroform): multiplets at 1.05–2.1δ, 2.05–2.7δ, 5.58δ, singlets at 3.30δ, 7.17δ, triplet at 3.36δ, broad multiplet at 3.8–4.3δ; elemental analysis:

| Found: | C, 68.5; | H, 10.2%; | |
|---|---|---|---|
| C$_{21}$H$_{36}$O$_5$ | requires | C, 68.5; | H, 9.8%]. |

The intermediate 7-(7-alkenyl-1,4-dioxaspiro[4,4]non-6-yl) heptanoic acids were prepared as follows:

By proceeding in a manner similar to that hereinbefore described in Example 2(i) and 2(ii) for the preparation of 7-{1,4-dioxa-7-(3-oxooct-1-enyl)spiro[4,4]non-6-yl} heptanoic acid but substituting the 1-chloroheptana-2-one used as a starting material by the -chloroheptan-quantities of 1-chlorononan-2-one, 1-chloroundecan-2-one, 1-chlorohexan-2-one, 1-chloropentan-2-one, 1-chloro-4-methylheptan-2-one, 1-chloro-5-methylheptan-2-one, 1-chloro-6-methylheptan-2-one, chlorohethyl cyclohexyl ketone and 1-chloro-7-methoxyheptan-2-one respectively, there were prepared, via the intermediates:

2-oxononyltriphenylphosphonium chloride, m.p. 205°–207°C., 2-oxoundecyltriphenylphosphonium chloride, m.p. 170°C., 2-oxohexyltriphenylphosphonium chloride, 2ooxopentyltriphenylphosphonium chloride, m.p. 159°C., 4-methyl-2-oxoheptyltriphenylphosphonium chloride,
5-methyl-2-oxoheptyltriphenylphosphonium chloride,
6-methyl-2-oxoheptyltriphenylphosphonium chloride, m.p. 160°C.,
2-cyclohexyl-2-oxoethyltriphenylphosphonium chloride, m.p. 181°–183°C. and
7-methoxy-2-oxoheptyltriphenylphosphonium chloride, m.p. 100°–102°c.;
octanoylmethylenetriphenylphosphorane, m.p. 74°–76°C.,
decanoylmethylenetriphenylphosphorane, m.p. 74°–76°C.,
pentanoylmethylenetriphenylphosphorane, m.p. 54°–56°C.,
butyrylmethylenetriphenylphosphorane, m.p. 158°–161°C., 3-methylhexanoylmethylenetriphenylphosphorane, m.p. 90°–93°C.,
4-methylhexanoylmethylenetriphenylphosphorane, m.p. 65°–68°C.,
5-methylhexanoylmethylenetriphenylphosphorane, m.p. 99°–104°C.,
cyclohexylcarbonylmethylenetriphenylphosphorane, m.p. 164°–165°C. and
6-methoxyhexanoylmethylenetriphenylphosphorane;
6-(7-hydroxyheptyl)-1,4-dioxa-7-(3-oxodec-1-enyl)spiro-[4,4]nonane,
6-(7-hydroxyheptyl)-1,4-dioxa-7-(3-oxododec-1-enyl)spiro-[4,4]nonane,
6-(7-hydroxyheptyl)-1,4-dioxa-7-(3-oxohept-1-enyl)spiro-[4,4]nonane,
6-(7-hydroxyheptyl)-1,4-dioxa-7-(3-oxohex-1-enyl)spiro-[4,4]nonane,
6-(7-hydroxyheptyl)-7-(5-methyl-3-oxooct-1-enyl)-1,4-dioxaspiro[4,4]nonane,
6-(7-hydroxyheptyl)-7-(6-methyl-3-oxooct-1-enyl)-1,4-dioxaspiro[4,4]nonane,
6-(7-hydroxyheptyl)-7-methyl-3-oxooct-1-enyl)-1,4-dioxaspiro[4,4]nonane,
7-(3-cyclohexyl-3-oxoprop-1-enyl)-6-(7-hydroxyheptyl)-1,4-dioxaspiro[4,4]nonane and
6-(7-hydroxyheptyl)-7-(8-methoxy-3-oxooct-1-enyl)-1,4-dioxaspiro[4,4]nonane; { these 7-alkenyl-6-hydroxyheptyl-1,4-dioxaspiro[4,4]nonanes were obtained in a crude form but all were pure enough to use as starting materials in the preparation of the 7-(7-alkenyl-1,4-dioxaspiro[4,4]non-6-yl)heptanoic acids } ; the following compounds:
7-{1,4-dioxa-7-(3-oxodec-1-enyl)spiro[4,4]non-6-yl}-heptanoic acid, $\nu_{max}$. 1620 cm$^{-1}$, 1660 cm$^{-1}$, 1700 cm$^{-1}$, 7-{1,4-dioxa-7-(3-oxododec-1-enyl)spiro[4,4]non-6-yl}-heptanoic acid, 7-{1,4-dioxa-7-(3-oxohept-1-enyl)spiro[4,4]non-6-yl}-heptanoic acid, $\nu_{max}$ 1620 cm$^{-1}$, 1660 cm$^{-1}$, 1700 cm$^{-1}$, 7-{1,4-dioxa-7-(3-oxohex-1-enyl)spiro[4,4]non-6-yl}-heptanoic acid, 7-{7-(5-methyl-3-oxooct-1-enyl)-1,4-dioxaspiro[4,4]non-6-yl}-heptanoic acid, 7-{7-(6-methyl-3-oxooct-1-enyl)-1,4-dioxaspiro[4,4]non-v 6-yl}-heptanoic acid, 7-{7-(7-methyl-3-oxooct-1-enyl)-1,4-dioxaspiro[4,4]non-6-yl}heptanoic acid, 7-{7-(3-cyclohexyl-3-oxoprop-1-enyl)-1,4-dioxaspiro[4,4]-non6-yl } heptanoic acid, $\nu_{max}$ 1620 cm$^{-1}$, 1660 cm$^{-1}$, 1700 cm$^{-1}$, and 7-{7-(8-methoxy-3-oxooct-1-enyl)-1,4-dioxaspiro[4,4]-non-6-yl}heptanoic acid.

EXAMPLE 9

7-[5-(3-Adamantyl-3-hydroxyprop-1-enyl)-2-oxocyclopentyl]-heptanoic acid i. Preparation of 7-(3-adamantyl-3-oxoprop-1-enyl)-6-(7-hydroxyheptyl)-1,4-dioxaspiro[4,4]nonane A mixture of 7-formyl-6-(7-hydroxyheptyl)-1,4-dioxaspiro[4,4]nonane [2.7 g; prepared as described in Example 1(iv)] and adamantylcarbonylmethylenetriphenylphosphorane [4.38 g.; prepared according to the method described by Kucher, Coll. Czech. Chem. Comm. (1968), 33, 880]in hexamethylphosphorustriamide (60 ml.) was heated on a steam bath for 4 days. Diethyl ether was added to the cooled reaction mixture and the solid which separated out was filtered off. The filtrate was washed twice with water, dried over anhydrous sodium sulphate and evaporated to give crude 7-(3-adamantyl-3-oxoprop-1-enyl)-6-(7-hydroxyheptyl)-1,4-dioxaspiro[4,4]nonane ($\nu_{max}$ 1620 cm$^{-1}$, 1680 cm$^{-1}$). This material was used for the next step, the preparation of 7-{7-(3-adamantyl-3-oxoprop-1-enyl)-1,4-dioxaspiro[4,4]non-6-yl}heptanoic acid, without further purification being necessary.

(ii) Preparation of 7-{7-(3-adamantyl-3-oxoprop-1-enyl)-1,4-dioxaspiro[4,4]non-6-yl}heptanoic acid By proceeding in a similar manner to that described above in Example 2(ii) for the preparation of 7-{1,4-dioxa-7-(3-oxooct-1-enyl)spiro[4,4]non-6-yl}-heptanoic acid, but substituting the appropriate quantity of 7-(3-adamantyl-3-oxoprop-1-enyl)-6-(7-hydroxyheptyl)-1,4-dioxaspiro[4,4]nonane for the 6-(7-hydroxyheptyl)-1,4-dioxa-7-(3-oxooct-1-enyl)spiro[4,4]nonane used as starting material, there was prepared 7-{7-(3-adamantyl-3-oxoprop-1-enyl)-1,4-dioxaspiro[4,4]non-6-yl}heptanoic acid.

iii. Preparation of 7-[5-(3-adamantyl-3-hydroxyprop-1-enyl)-2-oxocyclopentyl]heptanoic acid By proceeding in a similar manner to that described above in Example 2(iii) for the preparation of 7-[5-(3-hydroxyoct-1-enyl)-2-oxocyclopentyl]heptanoic acid, but substituting the appropriate quantity of 7-{7-(3-adamantyl-3-oxoprop-1-enyl)-1,4-dioxaspiro[4,4]non-6-yl}-heptanoic acid for the 7-{1,4-dioxa-7-(3-oxooct-1-enyl)-spiro[4,4]non-6-yl } heptanoic acid used as starting material, there was prepared 7-[5-(3-adamantyl-3-hydroxyprop-1-enyl)-2-oxocyclopentyl]-heptanoic acid [$\nu_{max}$ 980 cm$^{-1}$, 1630 cm$^{-1}$, 1700 cm$^{-1}$, 1730 cm$^{-1}$; NMR (approximately 10 percent solution in deuterochloroform): multiplets at 1.58δ, 1.68δ, 1.98δ, 3.7–4.35δ, 5.2–5.75δ].

EXAMPLE 10

7-[5-(3-Cyclopentyl-3-hydroxyprop-1-yl)-2-oxocyclopentyl]heptanoic acid

A solution of 7-[5-(3-cyclopentyl-3-hydroxyprop-1-enyl)-2-oxocyclopentyl]heptanoic acid (1.0 g.; prepared as described in Example 4) in ethanol (50 ml.) was catalytically reduced with hydrogen at a pressure of 7 kg/cm$^2$ and in the presence of a 5 percent palladium on charcoal catalyst (0.5 g.) at room temperature for 3 hours. The catalyst was then filtered off and the ethanol evaporated to give 7-[5-(3-cyclopentyl-3-hydroxyprop-1-yl)-2-oxocyclopentyl]heptanoic acid (0.8 g.).

A pure sample of the acid was obtained by separation using preparative thin-layer chromatography on silica gel, using as the eluent a 40:40:1 mixture by volume of ethyl acetate, cyclohexane and formic acid [$\nu_{max}$ 1700 cm$^{-1}$, 1720 cm$^{-1}$; NMR (approximately 10 percent solution in deuterochloroform): multiplets at 0.9–2.05δ, 2.05–2.6δ, 3.2–3.7δ, and a singlet at 6.04δ; elemental analysis:

| Found: | C, 70.7; | H, 10.0%; |  |
|---|---|---|---|
| $C_{20}H_{34}O_4$ | requires | C, 71.0; | H, 10.0% ]. |

EXAMPLE 11

7-[5-(3-Hydroxyoct-1-enyl)-3-methyl-2-oxocyclopentyl]-heptanoic acid.

i. Preparation of 3-oxo-2-[7-(2-tetrahydropyranyloxyheptyl]cyclopentanecarbonitrile 3,4-Dihydro-2H-pyran (7.3 g.) was added dropwise at 40°C. with stirring to a mixture of 2-(7-hydroxyheptyl)-3-oxocyclopentanecarbonitrile [10 g.; prepared as described in Example 1(ii)] and concentrated hydrochloric acid (4 drops). The temperature was allowed to rise to 65°C. and was maintained at 65°C. for 1 hour. The solution was cooled and benzene (50 ml.) was added. The solution was washed with aqueous sodium bicarbonate and then water, and dried over sodium sulphate. The solvent was removed in vacuo to give crude 3-oxo-2-[7-(2-tetrahydropyranyloxylheptyl]cyclopentanecarbonitrile (15 g.). This material was used for the next step, the preparation of 4-ethoxalyl-3-oxo-2-[7-(2-tetrahydropyranyloxyheptyl]-cyclopentanecarbonitrile, without further purification being necessary.

ii. Preparation of 4-ethoxalyl-3-oxo-2-[7-(2-tetrahydropyranyloxy)heptyl]cyclopentanecarbonitrile An ice-cold solution of 3-oxo-2-[7-(2-tetrahydropyranyloxy)heptyl]cyclopentanecarbonitrile (15 g.) and diethyl oxalate (15.9 g.) in dry benzene (110 ml.) was added to dry sodium methoxide (5.9 g.). The mixture was then left to stand at room temperature for 24 hours. Ice-water was then added, and the layers separated. The aqueous layer was washed with benzene and the benzene solutions combined. It was then added to 30 percent aqueous sodium dihydrogen phosphate solution (150 ml.) at 0°C. The combined benzene solutions were extracted four times with ice-cold 4 percent aqueous sodium hydroxide solution, and the combined alkaline extracts added to the aqueous sodium dihydrogen phosphate solution, stirred at 0°C. for 15 minutes, and then extracted with diethyl ether. The combined ethereal extracts were washed with water and dried over sodium sulphate. The solvent was removed in vacuo to give crude 4-ethoxalyl-3-oxo-2-[7-(2-tetrahydropyranyloxy)heptyl]cyclopentanecarbonitrile (11.2 g.). $\nu_{max}$. 1720 cm$^{-1}$, 1670 cm$^{-1}$, 1605 cm$^{-1}$.

iii. Preparation of 4-methyl-3-oxo-2-[7-(2-tetrahydropyranyloxy)heptyl]cyclopentanecarbonitrile A mixture of 4-ethoxalyl-3-oxo-2-[7-(2-tetrahydropyranyloxy)heptyl]cyclopentanecarbonitrile (11.2 g.), anhydrous potassium carbonate (22 g.), methyl iodide (67 ml.), and undried acetone (450 ml.) was stirred and heated at reflux for 22 hours. The mixture was then cooled and filtered, and the filtrate concentrated in vacuo. Water was added to the residue and the mixture extracted with diethyl ether. The combined ethereal extracts were washed successively with 2N aqueous sodium hydroxide solution and water, and then dried over sodium sulphate. The diethyl ether was removed in vacuo to give crude 4-methyl-3-oxo-2-[7-(2-tetrahydropyranyloxy)heptyl]cyclopentanecarbonitrile (8.3 g.), $\nu_{max}$. 1730 cm$^{-1}$. This material was used for the next step, the preparation of 2-(7-hydroxyheptyl)-4-methyl-3-oxocyclopentanecarbonitrile, without further purification being necessaary.

iv. Preparation of 2-(7-hydroxyheptyl)-4-methyl-3-oxocyclopentanecarbonitrile 60 percent Aqueous perchloric acid solution (6 drops) was added to a solution of 4-methyl-3-oxo-2-[7-(2-tetrahydropyranyloxy)heptyl]cyclopentanecarbonitrile (8.3 g.) in dry ethanol (35 ml.). After 24 hours chloroform was added, and the solution washed successively with 2N aqueous sodium carbonate solution and saturated aqueous sodium chloride solution, and dried over sodium sulphate. The solvents were removed in vacuo, and the residue distilled under pressure to give 2-(7-hydroxyheptyl)-4-methyl-3-oxocyclopentanecarbonitrile (3.5 g.), b.p. 140°-200°C./0.15 mm.Hg, $\nu_{max}$. 1730 cm$^{-1}$ elemental analysis:

| Found: | C, 70.2; | H, 10.0; | N, 5.4%; |
|---|---|---|---|
| C$_{14}$H$_{23}$NO$_2$ | requires | C, 70.8; | H, 9.8; | N, 5.9%). | v. Preparation of 7-[5-(3-hydroxyoct-1-enyl)-3-methyl-2-oxocyclopentyl]heptanoic acid By proceeding in a similar manner to that hereinbefore described in Example 1(iii)-(vii) for the preparation of 7-[5-(3-hydroxy-4-methyloct-1-enyl)-2-oxocyclopentyl]heptanoic acid from 2-(7-hydroxyheptyl)-3-oxocyclopentanecarbonitrile, but substituting as starting material 2-(7-hydroxyheptyl)-4-methyl-3-oxocyclopentanecarbonitrile, there was prepared 7-[5-(3-hydroxyoct-1-enyl)-3-methyl-2-oxocyclopentyl]-heptanoic acid [$\nu_{max}$. 980 cm$^{-1}$, 1700 cm$^{-1}$, 1720 cm$^{-1}$; NMR (approximately 10 percent solution in deuterochloroform): triplet at 0.89$\delta$ (J = 5.5 cycles/second), two doublets at 1.04$\delta$ and 1.10$\delta$ (J = 6.0 cycles/second), multiplets at 1.0–2.1$\delta$, 2.0–2.75$\delta$, 5.53$\delta$, and singlet at 6.56$\delta$; elemental analysis:

| Found: | C, 71.0; | H, 10.6%; |
|---|---|---|
| C$_{21}$H$_{36}$O$_4$ | requires | C, 71.6; | H, 10.3%] | via the intermediates:
7-cyano-6-(7-hydroxyheptyl)-9-methyl-1,4-dioxaspiro-[4,4]nonane,
7-formyl-6-(7-hydroxheptyl)-9-methyl-1,4-dioxaspiro-[4,4]nonane,
6-(7-hydroxyheptyl)-9-methyl-7-(3-oxooct-1-enyl)-1,4-dioxaspiro[4,4]nonane and
7-{9-methyl-1,4-dioxa-7-(3-oxooct-1-enyl)spiro[4,4]non-6-yl}heptanoic acid.

EXAMPLE 12

7-[2-Methoxyimino-5-(3-hydroxyoct-1-enyl)cyclopentyl]-heptanoic acid i. Preparation of 2-(7-hydroxyheptyl)-3-methoxyiminocyclopentanecarbonitrile A mixture of 2-(7-hydroxyheptyl)-3-oxocyclopentanecarbonitrile [5.0 g.; prepared as described in Example 1(ii)], methoxylamine hydrochloride (2g.) and pyridine (6.1ml.) was left to stand at ambient temperature for 24 hours. Pyridine was removed in vacuo and water (20 ml.) was added. The mixture was extracted with diethyl ether and the extract dried over magnesium sulphate. The solvent was removed by evaporation and the residue was distilled under reduced pressure to give 2-(7-hydroxyheptyl)-3-methoxyiminocyclopentanecarbonitrile (4.33 g.), b.p. 150°-190°C./0.07 mm.Hg, [$\nu_{max}$. 1050 cm$^{-1}$, 2250 cm$^{-1}$].

ii. Preparation of 3-formyl-2-(7-hydroxyheptyl)methoxyiminocyclopentane

In a similar manner to that described in Example 1(iv) for the preparation of 7-formyl-6-(7-hydroxyheptyl)-1,4-dioxaspiro[4,4]nonane, but substituting the appropriate quantity of 2-(7-hydroxyheptyl)-3-methoxyiminocyclopentanecarbonitrile for the 7-cyano-6-(7-hydroxyheptyl)-1,4-dioxaspiro[4,4]nonane used as starting material, there was prepared 3-formyl-2-(7-hydroxyheptyl)methoxyiminocyclopentane [$\nu_{max}$. 1050 cm$^{-1}$, 1720 cm$^{-1}$, 2750 cm$^{-1}$].

iii. Preparation of 2-(7-hydroxyheptyl)-3-(3-oxooct-1-enyl)methoxyiminocyclopentane In a similar manner to that described in Example 2(i), for the preparation of 6-(7-hydroxyheptyl)-1,4-dioxa-7-(3-oxooct-1-enyl)spiro[4,4]nonane, but substituting the appropriate quantity of 3-formyl-2-(7-hydroxyheptyl)methoxyiminocyclopentane for the 7-formyl-6-(7-hydroxyheptyl)-1,4-dioxaspiro[4,4]nonane used as starting material, there was prepared 2-(7-hydroxyheptyl)-3-(3-oxooct-1-enyl)methoxyiminocyclopentane [$\nu_{max}$. 1050 cm$^{-1}$, 1620 cm$^{-1}$, 1660 cm$^{-1}$]· iv. Preparation of 7-[2-methoxyimino-5-(3-oxooct-1-enyl)cyclopentyl]heptanoic acid In a similar manner to that described in Example 1(vi) for the preparation of 7-{1,4-dioxa-7-(3-oxo-4-methyloct-1-enyl)spiro[4,4]non-6-yl}-heptanoic acid, but substituting the appropriate quanity of 2-(7-hydroxyheptyl)-3-(3-oxooct-1-enyl)-methoxyiminocyclopentane for the 6-(7-hydroxyheptyl)-1,4-dioxa-7-(3-oxo-4-methyloct-1-enyl)spiro[4,4]nonane used as starting material, there was prepared 7-[2-methoxyimino-5-(3-oxooct-1-enyl)cyclopentyl]heptanoic acid.

(v) Preparation of 7-[2-methoxyimino-5-(3-hydroxyoct-1-enyl)cyclopentyl]heptanoic acid A solution of sodium borohydride (0.222g.) in 0.2N aqueous sodium hydroxide (2ml.) was added dropwise to a solution of 7-[2-methoxyimino-5-(3-oxooct-1-enyl)-cyclopentyl]heptanoic acid (0.84 g.) in ethanol (50 ml.) and N sodium hydroxide (2 ml.). The resulting solution was stirred for 20 hours and then the ethanol removed in vacuo. Water (10 ml.) was added and the resulting solution was washed with diethyl ether. The aqueous layer was then covered with a layer of diethyl ether and acidified to pH 1 by the dropwise addition of concentrated hydrochloric acid. The ethereal layer was separated and the aqueous layer was extracted twice more with diethyl ether. The combined ethereal extracts were dried over magnesium sulphate and the solvent evaporated to give 7-[2-methoxyimino-5-(3-hydroxyoct-1-enyl)cyclopentyl]heptanoic acid hemihydrate [$\nu_{max}$ 1050 cm$^{-1}$, 1700 cm$^{-1}$; elemental analysis:

| Found: | C, 67.5; | H, 9.9; | N 3.31%; |
|---|---|---|---|
| $C_{21}H_{37}NO_4 \cdot \frac{1}{2}H_2O$ requires | C, 67.3; | H, 10.2; | N, 3.7%. |

NMR (approximately 10 percent solution in deuterochloroform): multiplets at 5.42–5.70δ, 3.35–4.35δ, 2.05–3.0δ, 1.05–2.05δ, triplet at 0.87δ (J = 5.0 cycles/second), singlet at 3.82δ and a broad singlet at 6.64–7.45δ].

EXAMPLE 13

Preparation of 7-[5-(3-acetoxy-4-methyloct-1-enyl)-2-oxocyclopentyl]heptanoic acid.

A solution of 7-[5-(3-hydroxy-4-methyloct-1-enyl)-2-oxocyclopentyl]heptanoic acid [0.34 g.; prepared as described in Example 1 (vii)] in dry pyridine (10ml.) was treated with acetic anhydride (10 ml.) and the resulting solution was allowed to stand at ambient temperature for 3 days and then diluted with water with external cooling by an ice-bath. The resulting aqueous solution was extracted twice with diethyl ether and the combined extracts washed with dilute hydrochloric acid and water, then dried over magnesium sulphate. Evaporation in vacuo gave 7-[5-(3-acetoxy-4-methyloct-1-enyl)-2-oxocyclopentyl]heptanoic acid (0.37 g.), which was purified by preparative thin layer chromatography on silica gel using a 40:40:1 mixture by volume of ethyl acetate, cyclohexane and formic acid as eluent.
Elemental analysis:

| Found: | C, 70.1; | H, 10.0%; | |
|---|---|---|---|
| $C_{23}H_{40}O_5$ requires | C, 70.0; | H, 9.7%. | |

$\nu_{max}$ 975 cm$^{-1}$, 1240 cm$^{-1}$, 1700 cm$^{-1}$, 1715 cm$^{-1}$, 1725 cm$^{-1}$.

EXAMPLE 14

Methyl 7-[5-(3-cylcohexyl-3-hydroxyprop-1-enyl)-2-oxocyclopentyl]heptanoate

A solution of diazomethane in diethyl ether (100 ml.) was added to 7-[5-(3-cyclohexyl-3-hydroxyprop-1-enyl)-2-oxocyclopentyl]heptanoic acid [2.0 g.; prepared as described in Example 8] and the reaction mixture was left to stand for one day at room temperature. The polymethylenes formed as by-products of the reaction were removed by filtration and the filtrate washed with dilute aqueous sodium carbonate solution. Evaporation of the ethereal extract gave crude methyl 7-[5-(3-cyclohexyl-3-hydroxyprop-1-enyl)-2-oxocyclopentyl]heptanoate [$\nu_{max}$ 980 cm$^{-1}$, 1730 cm$^{-1}$, 3450 cm$^{-1}$; NMR (approximately 10 percent solution in deuterochloroform): singlets at 3.68δ, 4.30δ and a multiplet at 5.40–5.70δ].

EXAMPLE 15

By proceeding in a similar manner to that described above in Example 14 for the preparation of methyl 7-[5-(3-cyclohexyl-3-hydroxyprop-1-enyl)2-oxocyclopentyl]heptanoate, but substituting the appropriate quantities of 7-[5-(3-cyclopentyl-3-hydroxyprop-1-enyl)-2-oxocyclopentyl]heptanoic acid and 7-[5-(3-hydroxydodec-1-enyl)-2-oxocyclopentyl]heptanoic acid (prepared as described in Examples 4 and 8 respectively) for the 7-[5-(3-cyclohexyl-3-hydroxyprop-1-enyl)-2-oxocyclopentyl]heptanoic acid used as starting material, there were prepared methyl 7-[5-(3-cyclopentyl-3-hydroxyprop-1-enyl)-2-oxocyclopentyl]heptanoate ($\nu_{max}$ 980 cm$^{-1}$, 1725 cm$^{-1}$, 3450 cm$^{-1}$) and methyl 7-[5-(3-hydroxydodec-1-enyl)-2-oxocyclopentyl]heptanoate ($\nu_{max}$ 980 cm$^{-1}$, 1730 cm$^{-1}$, 3470 cm$^{-1}$; elemental analysis:

| Found: | C, 73.1; | H, 10.8%; | |
|---|---|---|---|
| $C_{25}H_{44}O_4$ requires | C, 73.4; | H, 10.9%). | |

EXAMPLE 16

N-methyl-7-[5-(3-hydroxydodec-1-enyl)-2-oxocyclopentyl]-heptanoamide

A mixture of methyl 7-[5-(3-hydroxydodec-1-enyl)-2-oxocyclopentyl]heptanoate (0.30 g.; prepared as described in Example 15), N-methylformamide (1.9 g.) and anhydrous sodium methoxide (0.06 g.) was heated at 100°C. for one day. After cooling, ice-cold 5 percent aqueous hydrochloric acid was added and the mixture was extracted with chloroform. The chloroform extract was washed with water and dried over sodium sulphate. The chloroform was removed in vacuo, and the residue was purified by preparative thin-layer chromatography on silica gel using a 5:3 mixture by volume of benzene and dioxane as the eluent, to give N-methyl-7-[5-(3-hydroxydodec-1-enyl)-2-oxocyclopentyl]heptanoamide (0.09 g.) [$\nu_{max}$ 980 cm$^{-1}$, 1560 cm$^{-1}$, 1650 cm$^{-1}$, 1720 cm$^{-1}$, 3300 cm$^{-1}$; NMR (approximately 10 percent solution in deuterochloroform): triplet at 0.86δ, (J = 5.0 cycles/second), multiplets at 1.05–1.95δ, 1.95–2.6δ, 5.2–6.2δ, doublet at 3.77δ (J = 4.5 cycles/second), and a broad multiplet at 3.75–4.25δ].

EXAMPLE 17

By proceeding in a similar manner to that described above in Example 14 for the preparation of methyl 7-[5-(3-cyclohexyl-3-hydroxyprop-1-enyl)-2-oxocyclopentyl]heptanoate, but substituting the appropriate quantity of diazoheptane (prepared as described by Pormale, Plisko and Danilov, Org.Chem. U.S.S.R. (English Edn.), 1965, I, 1788) for the diazomethane used as starting material, there was prepared heptyl 7-[5-(3-cyclohexyl-3-hydroxyprop-1-enyl)-2-oxocyclopentyl]heptanoate [$\nu_{max}$ 980 cm$^{-1}$, 1730 cm$^{-1}$, 3450 cm$^{-1}$, NMR (approximately 10 percent solution in deuterochloroform): multiplets at 5.45–5.65δ, 3.7–4.1δ, 1.05–2.7δ, triplets at 4.06δ (J = 6.0 cycles/second) and 0.91δ (J = 5.5 cycles/second)].

The present invention includes within its scope pharmaceutical compositions which comprise at least one compound of the above-mentioned novel class of cyclopentane derivatives of general formula I or, when $R_3$ represents a carboxy group, non-toxic salts thereof, together with a pharmaceutical carrier or coating. In clinical practice the novel compounds of the present invention will normally be administered orally, rectally, vaginally or parenterally.

Solid compostions for oral administration include compressed tablets, pills, dispersible powders, and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administraton include pharamceutically-acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavoring, perfuming and preserving agents. The compositions according to the invention, for oral administraton, also include capsules of absorbable material such as gelatin containing one or more of the active substances with or without the addition of diluents or excipients.

Solid compositions for vaginal administration include pessaries formulated in manner known per se and containing one or more of the active compounds.

Solid compositions for rectal adminstration include suppositories formulated in manner known per se and containing one or more of the active compounds.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also include adjuvants such as preserving, wetting, emulsifying and dispersing agents. They may be sterilised, for example, by filtration through a bacteria-retaining filter, by incorporation of sterilising agents in the compositions, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In general, the preparations should normally contain at least 0.025 percent by weight of active substance when required for administration by injection; for oral administration the preparations will normally contain at least 0.1% by weight of active substance. The dose employed depends upon the desired therapeutic effect, the route of administration and the duration of the treatment. In the adult, the doses are generally between 0.02 and 2.0 mg. by aerosol administration as bronchodilators, between 0.0002 and 2.0 mg./kg. body weight by intravenous administration, preferably by intravenous infusion at a rate of between 0.0001 and 1.0 mg./kg. body weight/minute as hypotensives, between 0.001 and 0.3 mg./kg. body weight orally as inhibitors of gastric acid secretion, and between 0.01 and 1.0 mg./kg body weight by intravenous administration, preferably by intravenous infusion at a rate of between 0.02 and 20 $\mu$g./kg. body weight/minute as stimulators of uterine contraction. If necessary these doses may be repeated as and when required.

The compounds of general formula I and, when $R_3$ represents a carboxy group, non-toxic salts thereof may be administered orally as bronchodilators by any method known per se for administration by inhalation of drugs which are not themselves gaseous under normal conditions of administration. Thus, a solution of the active ingredient in a suitable pharmaceutically-acceptable solvent, for example water, can be nebulized by a mechanical nebulizer, for example a Wright Neublizer, to give an aerosol of finely-divided liquid particles suitable for inhalation. Advantageously, the solution to be nebulized is diluted and preferably aqueous, solutions containing from 0.2 to 20 mg., and preferably 0.2 to 5.0 mg., of active ingredient per ml. of solution being particularly suitable. The solution may contain stabilizing agents such as sodium bisulphite and buffering agents to give it an isotonic character, e.g. sodium chloride, sodium citrate and citric acid.

The active ingredients may also be administered orally by inhalation in the form of aerosols generated from self-propelling pharmaceutical compositions. Compositions suitable for this purpose may be obtained by dissolving or suspending in finely-divided form, preferably micronized to an average particle size of less than 5 microns, the active ingredients in pharmaceutically-acceptable solvents, e.g. ethanol, which are co-solvents assisting in dissolving the active ingredients in the volatile liquid propellants hereinafter described, or pharmaceutically-acceptable suspending or dispersing agents, for example aliphatic alcohols such as oleyl alcohol, and incorporating the solutions or suspensions obtained with pharmaceutically-acceptable volatile liquid propellants, in conventional pressurized packs which may be made of any suitable material, e.g. metal, plastics or glass, adequate to withstand the pressures generated by the volatile propellant in the pack. Pressurized pharmaceutically-acceptable gases, such as nitrogen, may also be used as propellants. The pressurized pack is preferably fitted with a metered valve which dispenses a controlled quantity of the self-propelling aerosol composition as a single dose.

Suitable volatile liquid propellants are known in the art and include fluorochlorinated alkanes containing from one to four, and preferably one or two, carbon atoms, for example dichlorodifluoromethane, dichlorotetrafluoroethane, trichloromonofluoromethane, dichloromonofluoromethane and monochlorotrifluoromethane. Preferably, the vapour pressure of the volatile liquid propellant is between about 25 and 65 pounds, and more especially between about 30 and 55 pounds, per square inch gauge at 21°C. As is well-known in the art, volatile liquid propellants of different vapour pressures may be mixed in varying proportions to give a propellant having a vapour pressure appropriate to the production of a satisfactory aerosol and suitable for the chosen container. For example dichlorodifluoromethane (vapor pressure 85 pounds per square inch gauge at 21°C.) and dichlorotetrafluoroethane (vapour pressure 28 pounds per square inch gauge at 21°C.) may be mixed in varying proportions to give propellants having vapour pressures intermediate between those of two constituents e.g. a mixture of dichlorodifluoromethane and dichlorotetrafluoroethane in the proportions 38:62 respectively by weight has a vapour pressure of 53 pounds per square inch gauge at 21°C.

The self-propelling pharmaceutical compositions may be prepared by dissolving the required quantity of active ingredient in the co-solvent or combining the required quantity of active ingredient with a measured quantity of suspending or dispersing agent. A measured quantity of this composition is then placed in an open container which is to be used as the pressurized pack. The container and its contents are then cooled below the boiling temperature of the volatile propellant to be used. The required quanity of liquid propellant, cooled below its boiling temperature, is then added and the contents of the container mixed. THe container is then sealed with the required valve fitting, without allowing the temperature to rise above the boiling temperature of the propellant. The temperature of the sealed container is then allowed to rise to ambient with shaking to ensure complete homogeneity of the contents to give a pressurized pack suitable for generating aerosols for inhalation. Alternatively, the co-solvent solution of the active ingredient or combination of active ingredient and suspending or dispersing agent is placed in the open container, the container sealed with a valve, and the liquid propellant introduced under pressure.

Means for producing self-propelling compositions for generating aerosols for the administration fo medicaments are, for example, described in detail in U.S. Pat. Nos. 2,868,691 and 3,095,355.

Preferably, the self-propelling pharmaceutical compositions according to the present invention contain from 0.2 to 20 mg., and more particularly 0.2 to 5.0 mg., of active ingredient per ml. of solution or suspension. It is important that the pH of solutions and suspensions used, according to the present invention, to generate aerosols should be kept within the range 3 to 8 and preferable that they should be stored at or below 4°C., to avoid pharmacological deactivation of the active ingredient.

In carrying out the present invention, the means of producing an aerosol for inhalation should be selected in accordance with the physico-chemical properties of the active ingredient.

By the term "pharmaceutically-acceptable" as applied in this specification to solvents suspending or dispersing agents, propellants and gases is meant solvents, suspending or dispersing agents, propellants and gases which are non-toxic when used in aerosols suitable for inhalation therapy.

It is highly desirable that the aerosols should have a particle size less than about 10 microns and preferably less than 5 microns, for example between 0.5 and 3 microns, to ensure effective distribution to very narrow bronchioles. Preferably, administration is by means of devices enabling controlled quantities of the active ingredients to be administered, for example by means of the metered valves hereinbefore mentioned.

The following Examples illustrate pharmaceutical compositions according to the invention.

EXAMPLE 18

7-[5-(3-Hydroxy-4-methyloct-1-enyl)-2-oxocyclopentyl]heptanoic acid (300 mg.) was dissolved in ethanol (1 ml.) and the solution obtained was added to an aqueous solution (12 ml. ) containing sodium carbonate (50 mg.). Aqueous sodium chloride solution (0.9 percent w/v, 2ml.) was then added to give a final volume of 15 ml. The solution was then sterilized by passage through a bacteria-retaining filter and placed in 1.5 ml. portions in 5 ml. ampoules, to give 30 mg. of the heptanoic acid derivative (in the form of its sodium salt) per ampoule. The contents of the ampoules were freeze-dried and the ampoules sealed. Dissolution of the contents of an ampoule in a suitable volume, e.g. 2 ml. of sterile water or physiological saline gave a solution ready for administration by injection.

EXAMPLE 19

7-[5-(3-Hydroxy-5-methylhex-1-enyl)-2-oxocyclopentyl]heptanoic acid (300 mg.) was dissolved in ethanol (1 ml.) and the solution obtained was added to an aqueous solution (12 ml.) containing sodium carbonate (50 mg.). Aqueous sodium chloride solution (0.9 percent w/v, 2ml.) was then added to give a final volume of 15 ml. The solution was then sterilized by passage through a bacteria-retaining filter and placed in 1.5 ml. portions in 5 ml. ampoules, to give 30 mg. of the heptanoic acid derivative (in the form of its sodium salt) per ampoule. The contents of the ampoules were freeze-dried and the ampoules sealed. Dissolution of the contents of an ampoule in a suitable volume, e.g. 2 ml. of sterile water or physiological saline gave a solution ready for administration by injection.

We claim:

1. A 2 -hydroxyalkyl)cyclopentanecarbaldehyde of the formula:

wherein $R_5$ represents alkyl of 1 through 6 carbon atoms or hydrogen, n represents 5, 6, 7, or 8, and the symbols $R_7$ represent identical alkyl groups of 1 through 6 carbon atoms or together form ethylene.

2. A 2-hydroxyalkyl)cyclopentanecarbaldehyde of the formula:

wherein $R_5$ represents alkyl of 1 through 6 carbon atoms or hydrogen, n represents 5, 6, 7 or 8, and the symbols $R_7$ together form ethylene.

3. The cyclopentanecarbaldehyde according to claim 2 which is 7-formyl-6-(7-hydroxyheptyl)-1,4-dioxaspiro[4,4]nonane.

4. The cyclopentanecarbaldehyde according to claim 2 which is 7-formyl-6-(7-hydroxyheptyl)-9-methyl-1,4-dioxaspiro[4,4]nonane.

* * * * *